United States Patent
Skagmo et al.

(10) Patent No.: US 11,966,545 B2
(45) Date of Patent: Apr. 23, 2024

(54) TOUCH SENSING APPARATUS AND METHOD FOR ASSEMBLY

(71) Applicant: FlatFrog Laboratories AB, Lund (SE)

(72) Inventors: Daniel Skagmo, Malmo (SE); Robert Ehn, Lund (SE); Hakan Bergstrom, Torna-Hallestad (SE)

(73) Assignee: FlatFrog Laboratories AB, Lund (SE)

( * ) Notice: Subject to any disclaimer, the term of this patent is extended or adjusted under 35 U.S.C. 154(b) by 0 days.

(21) Appl. No.: 18/047,552

(22) Filed: Oct. 18, 2022

(65) Prior Publication Data

US 2023/0367431 A1 Nov. 16, 2023

Related U.S. Application Data

(63) Continuation of application No. 17/591,799, filed on Feb. 3, 2022, now Pat. No. 11,494,035, which is a
(Continued)

(30) Foreign Application Priority Data

Mar. 28, 2017 (SE) .................................. 1730085-6

(51) Int. Cl.
*G06F 3/042* (2006.01)
*G06F 3/041* (2006.01)

(52) U.S. Cl.
CPC .......... *G06F 3/0428* (2013.01); *G06F 3/0421* (2013.01); *G06F 3/0412* (2013.01);
(Continued)

(58) Field of Classification Search
CPC ....... G06F 3/042; G06F 3/0428; G06F 3/0423
See application file for complete search history.

(56) References Cited

U.S. PATENT DOCUMENTS 8,330,736 B2 12/2012 Klein et al.
8,780,066 B2 7/2014 Christiansson et al.
(Continued)

FOREIGN PATENT DOCUMENTS

CN 102117155 7/2011
CN 202661975 1/2013
(Continued)

OTHER PUBLICATIONS

Petition for Inter Partes Review Under 37 C.F.R. § 42.100, in the Inter Partes Review of U.S. Pat. No. 11,281,335, Oct. 6, 2023 (130 pages).
(Continued)

*Primary Examiner* — Sanjiv D. Patel
(74) *Attorney, Agent, or Firm* — Finnegan, Henderson, Farabow, Garrett & Dunner, LLP

(57) ABSTRACT

A touch sensing apparatus is disclosed comprising a panel that defines a touch surface, a plurality of light emitters and detectors arranged along a perimeter of the panel. The light emitters are arranged to emit a respective beam of emitted light that travels above the touch surface, wherein the light detectors are arranged to receive detection light from the emitted light. The plurality of light emitters and detectors are arranged above the touch surface and are connected to a substrate extending in a direction parallel with a normal axis of a plane in which the panel extends. A method of assembling a touch sensing apparatus is also disclosed.

15 Claims, 18 Drawing Sheets

Related U.S. Application Data continuation of application No. 17/101,538, filed on Nov. 23, 2020, now Pat. No. 11,269,460, which is a continuation of application No. 16/191,195, filed on Nov. 14, 2018, now Pat. No. 10,845,923, which is a continuation of application No. PCT/SE2018/050109, filed on Feb. 6, 2018.

(52) U.S. Cl.
CPC ............ *G06F 2203/04103* (2013.01); *G06F 2203/04107* (2013.01); *G06F 2203/04108* (2013.01)

(56) References Cited

U.S. PATENT DOCUMENTS

| | | |
|---|---|---|
| 8,816,991 B2 | 8/2014 | Miller et al. |
| 9,207,800 B1 | 12/2015 | Eriksson et al. |
| 9,280,237 B2 | 3/2016 | Kukulj |
| 9,291,845 B2 | 3/2016 | Shin et al. |
| 9,839,145 B2 | 12/2017 | Ryu et al. |
| 9,983,626 B2 | 5/2018 | Cao et al. |
| 10,775,935 B2 | 9/2020 | Kocovski et al. |
| 10,860,142 B1 | 12/2020 | Northcott et al. |
| 11,281,335 B2 | 3/2022 | Kocovski et al. |
| 11,281,338 B2 | 3/2022 | Skagmo et al. |
| 2009/0141003 A1* | 6/2009 | Xuan ................. G06F 3/0421 345/175 |
| 2012/0146950 A1 | 6/2012 | Park et al. |
| 2012/0223916 A1 | 9/2012 | Kukulj |
| 2013/0044073 A1 | 2/2013 | Christiansson et al. |
| 2013/0300714 A1* | 11/2013 | Goh ..................... H01L 31/173 345/175 |
| 2014/0111706 A1 | 4/2014 | Nakamura et al. |
| 2016/0295711 A1 | 10/2016 | Ryu et al. |
| 2016/0334942 A1 | 11/2016 | Wassvik |
| 2017/0123257 A1 | 5/2017 | Zhao |
| 2017/0308236 A1 | 10/2017 | Lee |
| 2019/0235701 A1 | 8/2019 | Han et al. |

FOREIGN PATENT DOCUMENTS

| | | |
|---|---|---|
| CN | 203386188 U | 1/2014 |
| CN | 203720812 | 7/2014 |
| CN | 104808843 A | 7/2015 |
| KR | 2018-0037749 | 4/2018 |
| WO | WO2018066761 | 4/2018 |

OTHER PUBLICATIONS

Declaration of Darran Cairns, Ph.D. Under 37 C.F.R. §42.100 Regarding U.S. Pat. No. 11,281,335, Oct. 6, 2023 (176 pages).
Petition for Inter Partes Review Under 37 C.F.R. § 42.100, in the Inter Partes Review of U.S. Pat. No. 10,775,935, Oct. 6, 2023 (125 pages).
Declaration of Darran Cairns, Ph.D. Under 37 C.F.R. §42.100 Regarding U.S. Pat. No. 10,775,935, Oct. 6, 2023 (170 pages).
Petition for Inter Partes Review Under 37 C.F.R. § 42.100, in the Inter Partes Review of U.S. Pat. No. 11,281,338, Oct. 6, 2023 (99 pages).
Declaration of Darran Cairns, Ph.D. Under 37 C.F.R. §42.100 Regarding U.S. Pat. No. 11,281,338, Oct. 5, 2023 (108 pages).

* cited by examiner

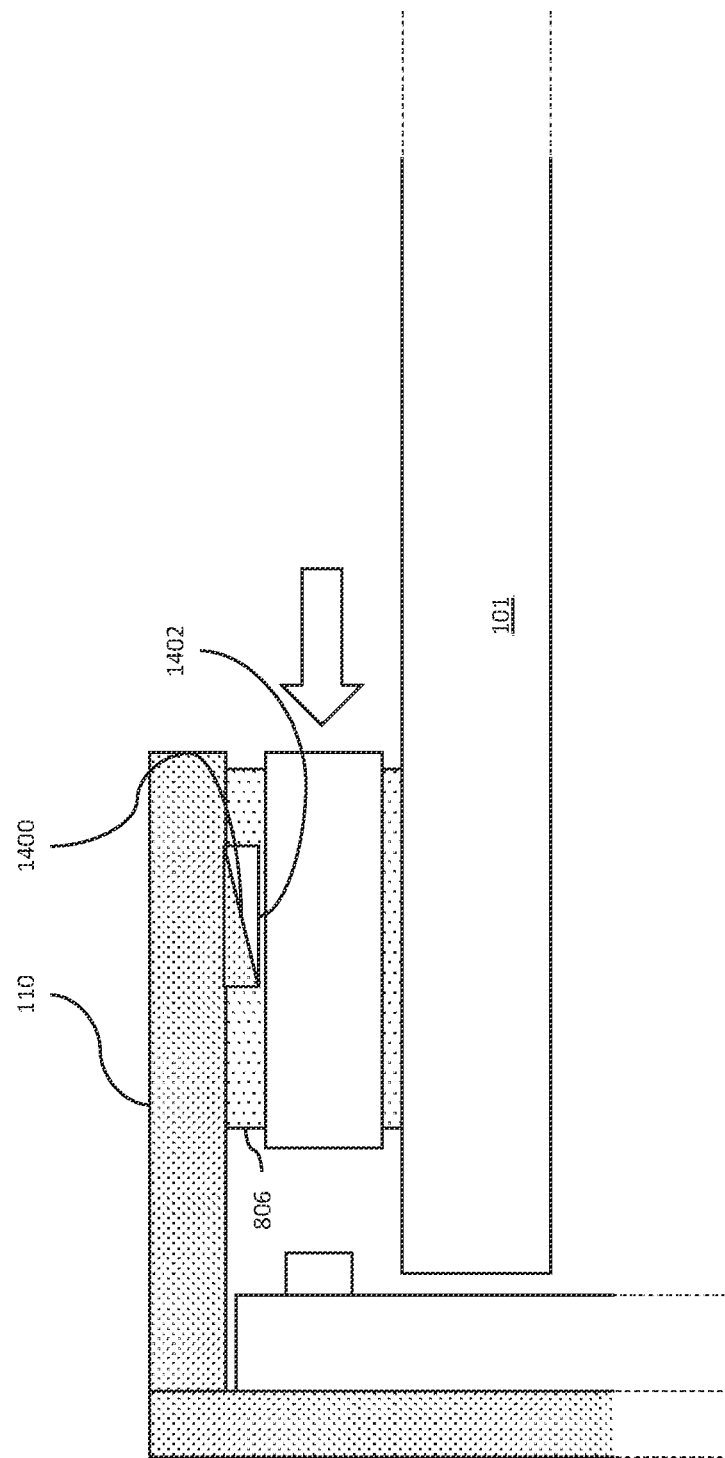

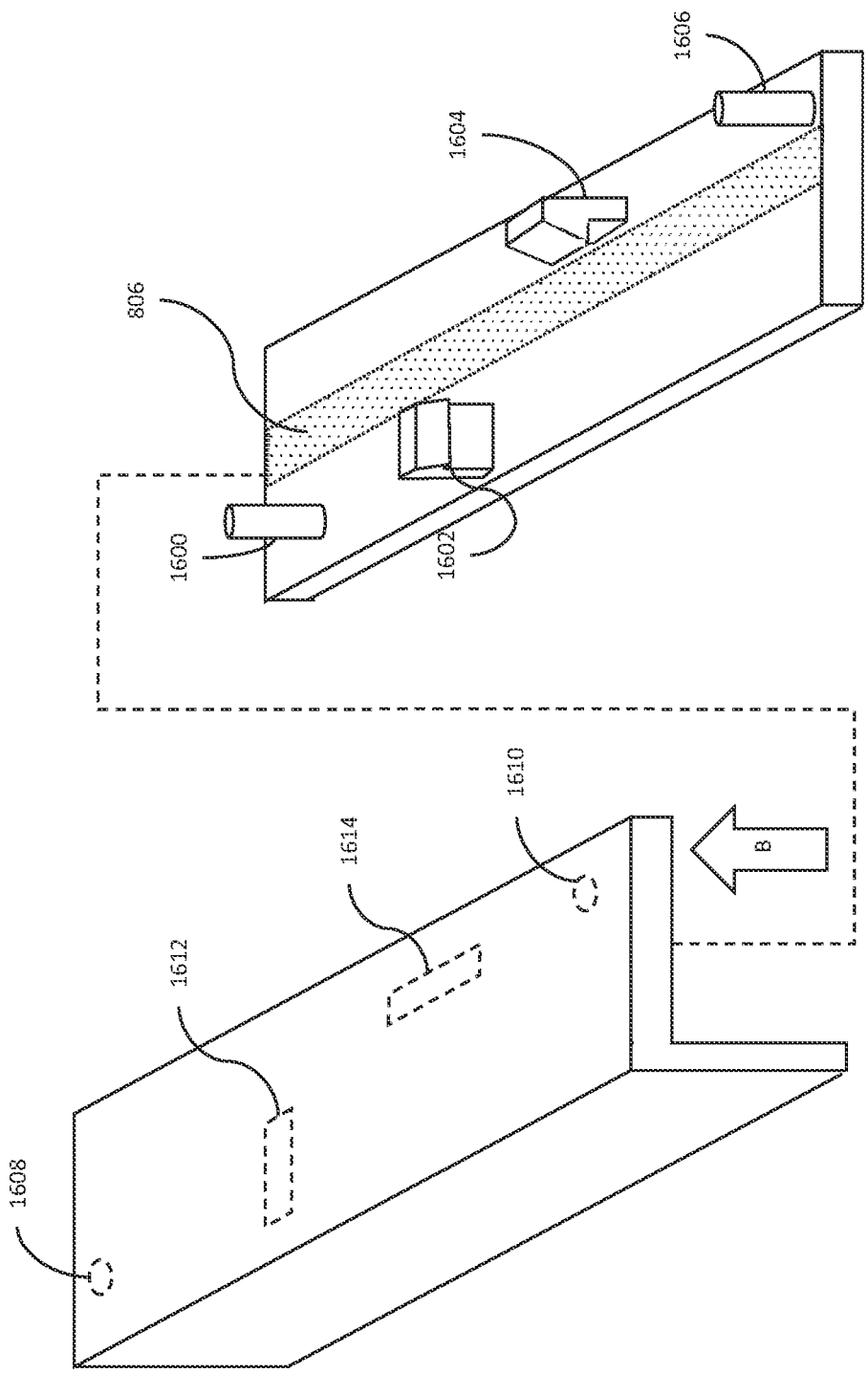

TOUCH SENSING APPARATUS AND METHOD FOR ASSEMBLY

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field of the Invention

The present invention relates to touch-sensing apparatus that operate by propagating light by diffusive light scattering above a panel, and in particular to optical and mechanical solutions for defining the light paths and control of curvature of the panel. The present invention relates furthermore to a method of assembling a touch sensing apparatus.

Background of the Invention

In one category of touch-sensitive panels known as 'above surface optical touch systems', a set of optical emitters are arranged around the periphery of a touch surface to emit light that is reflected to travel above the touch surface. A set of light detectors are also arranged around the periphery of the touch surface to receive light from the set of emitters from above the touch surface. An object that touches the touch surface will attenuate the light on one or more propagation paths of the light and cause a change in the light received by one or more of the detectors. The location (coordinates), shape or area of the object may be determined by analysing the received light at the detectors.

In a variant of such 'above surface optical touch system', illustrated in FIG. 1a in cross-section, the emitters 301 are arranged on a substrate 304, and light from the emitters travel above the touch surface 302 of the panel 305 via reflection or scattering on an edge reflector or diffusor 303. As shown in top-down view FIG. 1b, the light will then continue until deflected by a corresponding edge reflector at an opposing edge of the light transmissive panel, where the light will be scattered back down through the transmissive panel and onto the detectors 306.

Detectors 306 are distributed around the periphery of touch surface 302, to receive part of the propagating light. The light from each of emitters 301 will thereby propagate inside the transmissive panel 305 to a number of different detectors 306 on a plurality of light paths D. In the illustrated example, the apparatus 300 also includes a controller 320 which is connected to selectively control the activation of the emitters 301 and, possibly, the readout of data from the detectors 306. Depending on implementation, the emitters 301 and/or detectors 306 may be activated in sequence or concurrently. The signal processor 330 and the controller 320 may be configured as separate units, or they may be incorporated in a single unit. One or both of the signal processor 330 and the controller 320 may be at least partially implemented by software executed by a processing unit 340.

A problem with such previous systems is the cumbersome alignment between the components thereof, which makes assembly more difficult and costly. Sub-optimal alignment results in signal loss, which moreover is an inherent problem in previous solutions due to the multiple components involved in the light scattering process. Another issue affecting the signal and scattering of the light in the touch sensing apparatus is uncontrolled glass warpage, i.e. distortions of the curvature of the light transmissive panel which will affect the light path and the detection process. While it is critical to accurately control such distortions, previous solutions incorporate complex solutions that may not allow to fully optimize glass warpage control in a mass production line without limiting the throughput of the production.

Some prior art systems rely on coupling and propagation of collimated light across the light transmissive panel. Such systems are however cumbersome to reliably implement due to the small tolerances with respect to the alignment of the components thereof. E.g. the light emitters- and detectors need to be precisely aligned in relation to various lenses and reflect the light via concave and/or convex reflection and/or refraction to get the desired collimation. Such precise alignment may be difficult to achieve in mass production. The use of collimated light, or light reflected by means of specular reflection, also adds to this complexity, which in turn results in a more expensive and less compact system. Furthermore, to reduce system cost, it may be desirable to minimize the number of electro-optical components.

SUMMARY OF THE INVENTION

An objective is to at least partly overcome one or more of the above identified limitations of the prior art.

One objective is to provide a touch-sensitive apparatus based on "above-surface" light propagation which is robust and easy to assemble.

Another objective is to provide an "above-surface"-based touch-sensitive apparatus with efficient use of light.

One or more of these objectives, and other objectives that may appear from the description below, are at least partly achieved by means of touch-sensitive apparatuses according to the independent claims, embodiments thereof being defined by the dependent claims.

According to a first aspect, a touch sensing apparatus is provided comprising a panel that defines a touch surface, a plurality of light emitters and detectors arranged along a perimeter of the panel. The light emitters are arranged to emit a respective beam of emitted light above the touch surface, wherein the light detectors are arranged to receive detection light from the emitted light. The plurality of light emitters and detectors are connected to a substrate extending in a direction parallel with a normal axis of a plane in which the panel extends.

Preferably the plurality of light emitters and detectors are arranged above the touch surface.

Preferably the substrate extends at least partly above the touch surface, whereby the plurality of light emitters and detectors are connected to a portion of the substrate extending above the touch surface.

Preferably the substrate is fixed to a carrier mounted around the perimeter of the panel.

Preferably the carrier is arranged to at least partly enclose edges the panel.

Preferably the carrier comprises fixing elements configured to attach the carrier to a display unit.

Preferably the fixing elements are configured to attach the position of the substrate in relation to the carrier and/or in relation to the display unit.

Preferably the fixing elements are configured to interlock with a mounting element for locking the position of the carrier and/or the substrate to the display unit.

Preferably the fixing elements comprise openings, wherein the earner forms a cavity having walls at least partly enclosing the substrate, and wherein at least one of the walls comprises at least one of said openings.

Preferably the fixing elements comprise openings arranged in the carrier and in the substrate, wherein first openings of the carrier are aligned with second openings of the substrate, the first and second openings being configured to receive a mounting element configured to lock the position of the carrier and/or the substrate to the display unit.

Preferably the carrier is configured to be attachable to the display unit at an adjustable position along a direction parallel to the normal axis, whereby a distance between the panel and the display unit along the normal axis is variable upon attaching the carrier to the display unit at at least two different adjustable positions.

Preferably the fixing elements are configured to attach the carrier to the display unit at the adjustable positions along the direction parallel to the normal axis.

Preferably the openings are separated along a direction parallel to the normal axis, and/or wherein the carrier is attachable to a plurality of second openings in a display support of the display unit, the plurality of second openings being separated along the normal axis.

Preferably the carrier is formed from a single monolithic piece of material.

Preferably the substrate extends in a longitudinal direction along the perimeter of the panel, the substrate comprising secondary fixing units configured for variably attaching the position of the substrate on the carrier along the longitudinal direction and/or in the direction of the normal axis.

Preferably vertical alignment units are arranged between adjacent substrates extending in a longitudinal direction along the perimeter of the panel, wherein the vertical alignment units are configured to variably position the adjacent substrates in the direction of the normal axis so that an angle between the adjacent substrates is adjustable.

Preferably a plurality of substrates extend in a longitudinal direction along the perimeter of the panel, wherein a first substrate of said plurality of substrates comprises a connection unit configured to directly interlock with a subsequent connection unit of a subsequent substrate when arranged adjacent said subsequent substrate.

Preferably a sealing window is arranged around the perimeter of the panel, wherein the sealing window comprises a first surface facing the light emitters or the light detectors and an opposite second surface arranged adjacent the touch surface, whereby the emitted or detected light propagates between the first and second surface, and wherein at least one of the first and second surfaces comprises a light collimating surface configured to collimate light propagating above the touch surface.

Preferably the second surface extends in the direction of the normal axis between a base surface of the sealing window, facing the panel, and an opposite top surface of the sealing window, wherein the base surface is offset from the top surface along the direction of the plane with an offset distance so that the second surface forms an angle relative the normal axis, and wherein the second surface comprises a light collimating surface.

According to a second aspect, a touch sensing apparatus is provided comprising a panel extending in a plane having a normal axis, the panel defining a touch surface, a plurality of light emitters and detectors arranged along a perimeter of the panel, wherein the light emitters are arranged to emit a respective beam of emitted light above the touch surface, wherein the light detectors are arranged to receive detection light from the emitted light. The touch sensing apparatus comprises a sealing window arranged around the perimeter, wherein the sealing window comprises a first surface facing the light emitters or the light detectors and an opposite second surface arranged adjacent the touch surface, whereby the emitted or detected light propagates between the first and second surface, wherein the second surface extends in the direction of the normal axis between a base surface of the sealing window, facing the panel, and an opposite top surface of the sealing window, wherein the base surface is offset from the top surface along the direction of the plane with an offset distance so that the second surface forms an angle relative the normal axis, and wherein the second surface comprises a light collimating surface configured to collimate light propagating above the touch surface.

Preferably the first surface and/or second surface form a curved edge convex to the sealing window.

According to a third aspect, a method of assembling a touch sensing apparatus is provided comprising; attaching a substrate having a plurality of light emitters and detectors to a carrier; attaching the carrier around a perimeter of a panel and arranging the substrate to extend in a direction parallel with a normal axis of a plane in which the panel extends.

Preferably the plurality of light emitters and detectors are arranged above the touch surface.

Preferably the carrier if formed from a single monolithic piece of material, the carrier forming a cavity having walls at least partly enclosing the substrate, wherein at least one of the walls comprise openings, the method comprising fixing the carrier to a display unit by fixing mounting elements through said openings.

Preferably the method comprises adjusting a distance between the panel and a display unit along the normal axis by attaching the carrier to the display unit at at least two different adjustable positions along a direction parallel to the normal axis.

Preferably the method comprises adjusting a radius of curvature of the panel in the direction of the normal axis by attaching the carrier to a display unit at at least two different adjustable positions along a direction parallel to the normal axis.

According to a fourth aspect there is provided a touch sensing apparatus, comprising: a panel that defines a touch surface, a plurality of light emitters and detectors arranged along a perimeter of the panel and the light emitters are arranged to emit a respective beam of emitted light above the touch surface, and the light emitters are arranged to receive detection light from the emitted light, a substrate on which the plurality of light emitters and detectors are mountable; and a sealing window sealable against at least one surface of the touch sensing apparatus for sealing a cavity around the plurality of light emitters and detectors wherein the sealing window comprises at least one reference surface for aligning the substrate with respect to the sealing window.

Preferably the sealing window is sealable between the touch surface and a surface of the substrate.

Preferably the surface of substrate is a surface of a carrier for protecting components of the touch sensing apparatus.

Preferably the carrier comprises an upper portion which overlaps a portion of the perimeter of the panel and the sealing window is sealable between the touch surface and the underside of the overlapping upper portion.

Preferably the at least one reference surface is arranged to engage with a reciprocal reference surface on the substrate.

Preferably the at least one reference surface comprises a first portion for aligning in a first direction and a second portion for aligning in a second direction.

Preferably the at least one reference surface aligns the sealing window with respect to the substrate in a plane parallel with the touch surface.

Preferably the at least one reference surface aligns the sealing window with respect to the substrate at a height above the touch surface.

Preferably the sealing window comprises at least one resiliently deformable seal engagable with the substrate.

Preferably the resiliently deformable seal comprises the at least one reference surface.

Preferably the seal is extrudable along one or more surfaces of the sealing window.

Preferably the at least one reference surface substantially extends the entire length of the sealing window.

Preferably the sealing window and/or the substrate comprise a projection having a cross-sectional shape for positive engagement with a reciprocal hole in the substrate and/or sealing window and the at least one reference surface is part of the projection.

Preferably the sealing window and/or the substrate comprise a resiliently deformable projection wherein the projection comprises the at least one reference surface comprises and the projection is deformable on engagement with the substrate and/or sealing window and forms a snap-fit engagement therebetween.

Preferably the sealing window comprises a plurality of reference surfaces.

Preferably the at least one reference surface comprises at least one discrete upstanding projection for engagement with reciprocal hole in the substrate.

Preferably the at least one upstanding projection is one or more of, pegs, hooks, latches, clamps or fasteners.

According to a fifth aspect there is provided a method of manufacture of the touch sensing apparatus comprising: mounting a plurality of light emitters and detectors to a substrate, attaching the substrate around a perimeter of a panel; and mounting a sealing window against at least one surface of the touch sensing apparatus for sealing a cavity around the plurality of light emitters and detectors wherein the sealing window comprises at least one reference surface for aligning the substrate with respect to the sealing window.

Further examples of the invention are defined in the dependent claims, wherein features for the second aspect of the disclosure are as for the first aspect mutatis mutandis.

Some examples of the disclosure provide for a touch sensing apparatus that is easier to manufacture and assemble.

Some examples of the disclosure provide for a touch sensing apparatus with fewer steps of assembly.

Some examples of the disclosure provide for a touch sensing apparatus that is less costly to manufacture.

Some examples of the disclosure provide for a facilitated alignment of emitters and detectors of touch sensing apparatus.

Some examples of the disclosure provide for facilitated control of the curvature of the touch surface of a touch sensing apparatus.

Some examples of the disclosure provide for a more robust touch sensing apparatus.

Some examples of the disclosure provide for a touch sensing apparatus that is more reliable to use.

Some examples of the disclosure provide for a touch sensing apparatus that has a better signal-to-noise ratio of the detected light.

Some examples of the disclosure provide for a more compact touch sensing apparatus.

Still other objectives, features, aspects and advantages of the present disclosure will appear from the following detailed description, from the attached claims as well as from the drawings.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

These and other aspects, features and advantages of which examples of the invention are capable of will be apparent and elucidated from the following description of examples of the present invention, reference being made to the accompanying drawings, in which;

FIG. 14 is a cross sectional view of the touch sensing apparatus according to one example;

FIG. 16 is a schematic perspective view of the touch sensing apparatus according to one example.

DETAILED DESCRIPTION

Figure 1A:
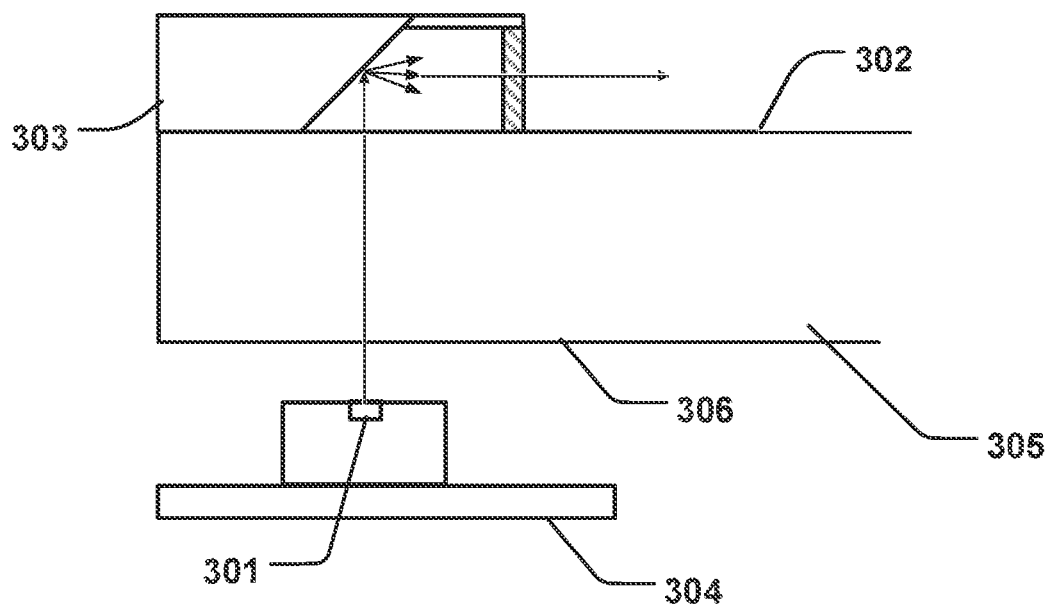
FIG. 1a is a section view of a touch sensing apparatus according to the prior art.

In the following, embodiments of the present invention will be presented for a specific example of a touch-sensitive apparatus 100. Throughout the description, the same reference numerals are used to identify corresponding elements.

Figure 1B:
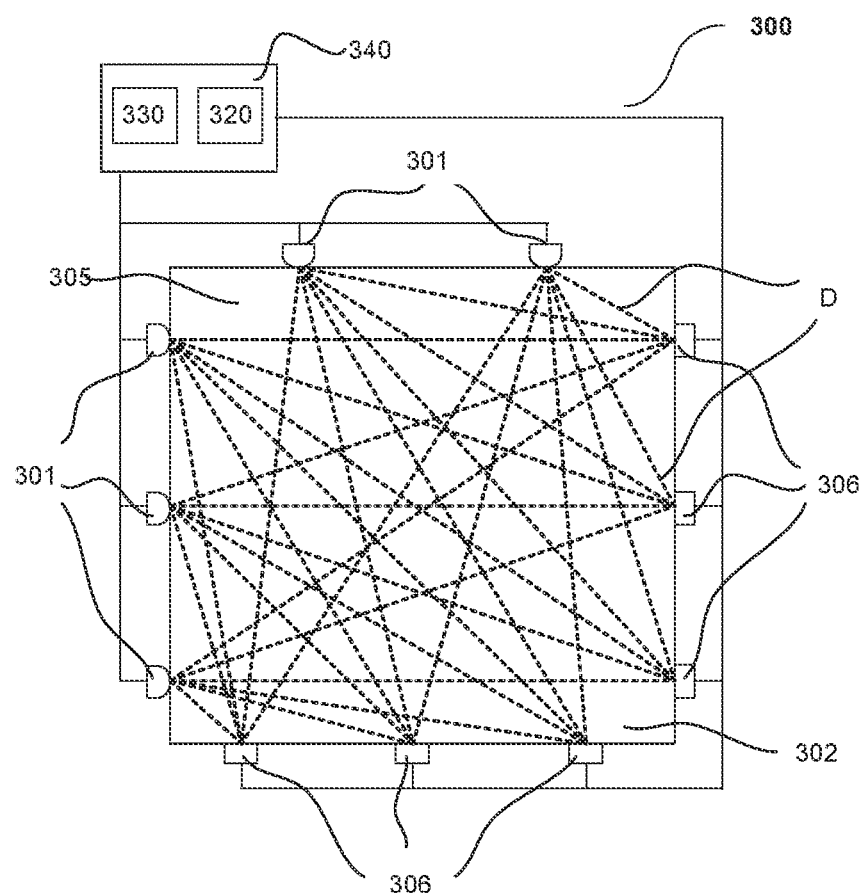
FIG. 1b is a top-down view of a touch sensing apparatus according to the prior art.

FIG. 1a schematically illustrates a variant of an 'above surface optical touch system', as discussed in the Background Art section above, where the light from the emitters 301 travel above the touch surface 302 of the panel 305 via reflection on an edge reflector 303. FIG. 1b illustrates a top plan view of FIG. 1a in an example of a touch-sensitive apparatus 100.

Figure 2:
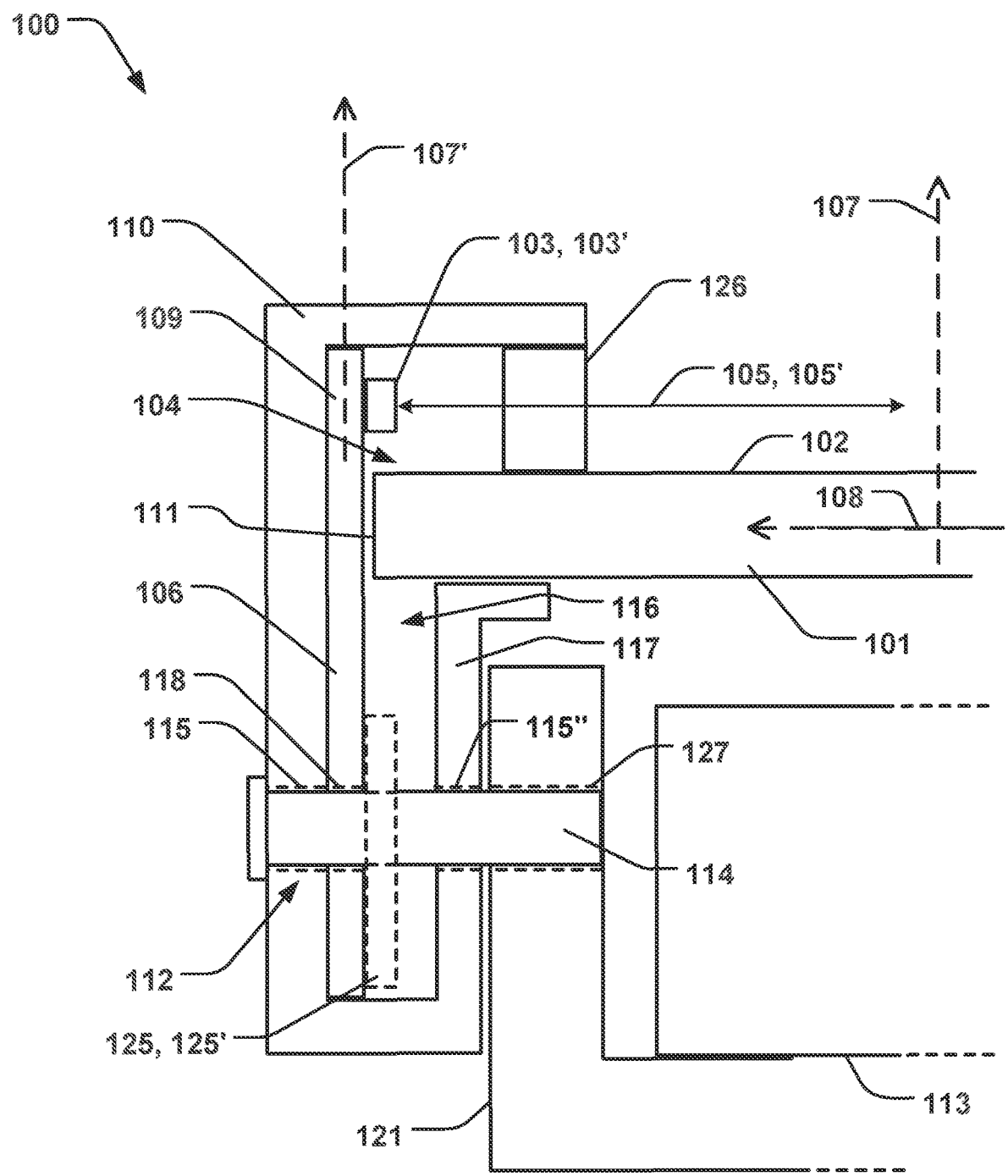
FIG. 2 is a schematic illustration, in a cross-sectional side view, of a touch sensing apparatus according to one example.

FIG. 2 schematically illustrate a touch sensing apparatus 100 comprising a light transmissive panel 101 that defines a touch surface 102. In some embodiments the light transmissive panel 101 is located above a display 130 and permits light generated by the display 130 to propagate therethrough. However in other embodiments the light transmissive panel 101 can comprise light blocking material and does not permit the transmission of light therethrough. For example, the touch sensing apparatus 100, can be a trackpad or another touch interface which is remote from the display unit 130. Hereinafter the term "light transmissive panel" 101 will be used to describe either a light transmissive panel 101 or a solid, opaque panel 101.

A plurality of light emitters 103 and detectors 103' are arranged along a perimeter 104 of the light transmissive panel 101. The light emitters 103 are arranged to emit a respective beam of emitted light 105 above the touch surface 102. I.e. while the touch surface 102 extends along a plane 108, having a normal axis 107 directed towards a user performing touch operations on the touch surface 102, the emitted light 105 travels parallel with plane 108 and at a certain distance from the touch surface 102 in the direction of the normal axis 107, as schematically illustrated with respect to light beam 105, 105', in e.g. FIG. 2. Light 105, 105', can thus travel across the touch surface 102, between opposite sides thereof, without being reflected inside the light transmissive panel 101 itself.

In other embodiments, the plurality of light emitters 103 and detectors 103' are optionally arranged along a perimeter 104 of the light transmissive panel 101 at a different height. In some embodiments, the light emitters 103 and/or detectors 103' are arranged to emit a respective beam of emitted light 105 below the touch surface 102 and the light beams are guided around the light transmissive panel 101. The light beams can be guided around the light transmissive panel 101 with additional reflective components (not shown). For the purposes of brevity, the embodiments discussed hereinafter refer to the plurality of light emitters 103 and detectors 103' being arranged above the touch surface 102, but the embodiments also include the arrangement where the plurality of light emitters 103 and detectors 103' are mounted below the touch surface 102.

The light detectors 103' are arranged to receive detection light 105' from the emitted light 105. FIG. 2 illustrates a section of the touch sensing apparatus 100 adjacent the perimeter 104 of the light transmissive panel 101. In this section, the emitters and detectors 103, 103', are shown in the same view, as well as the emitted and detected light 105, 105', for clarity of presentation. The plurality of light emitters and detectors 103, 103', are arranged above the touch surface 102 and are connected to a substrate 106 extending in a direction 107' parallel with a normal axis 107 of a plane 108 in which the light transmissive panel extends. By having the substrate 106 extending in parallel with the normal axis 107, the plurality of emitters and detectors 103, 103' are conveniently arranged, above the touch surface 102 to achieve a compact footprint in the direction of the plane 108 of the touch sensing apparatus 100 around the perimeter 104, while achieving a direct light path for the emitted or detected light 105, 105', above and across and touch surface 102. Thus, the emitted light 105 does not have to be reflected in order to diffusively spread above and across the touch surface 102, and a detector 103' may directly receive detection light 105' by being correspondingly positioned above the touch surface 102 at an opposite position anywhere around the perimeter 104. The amount of available light that can be utilized for the detection and characterization of an object touching the touch surface 102 can thus be maximized, and the signal to noise ratio can be improved. The touch sensing apparatus 100 may comprise a sealing window 126 as illustrated in FIG. 2, shielding the emitters and detectors 103, 103', from the outside. The emitted and detected light 105, 105', may thus only have to propagate through the sealing window 126 along the light path between the emitters and detectors 103, 103'. The sealing window 126 provides sealing around the perimeter 104 of the light transmissive panel 101 and protects the emitters and detectors 103, 103' and the display.

Having the substrate extending in the direction 107' being parallel with the normal axis 107 and the emitters and detectors 103, 103', arranged above the touch surface 102 provides for a less complex alignment to maximize the detection performance of the touch sensing apparatus 100. The position of the substrate 106 in the direction of the normal axis 107 can be accurately varied to achieve optical alignment with respect to the emitters and detectors 103, 103'. The ability to achieve an accurate positioning of the substrate 106, and consequently the emitters and detectors 103, 103', attached thereto, is also due to the increased accuracy by which the dimensions of the substrate 106 can be defined along the direction of the substrate 106 aligned with the normal axis 107 in FIG. 2. I.e. the substrate 106 is elongated and extends in a longitudinal direction 123 (FIG. 4a) around the perimeter 104 of the light transmissive panel 101, and it has a short-side extending in parallel with the normal axis 107. The short-side of the substrate 106, illustrated in the cross-sectional view of FIG. 2, may be manufactured to smaller tolerances, and by aligning this side with the normal axis 107, the tolerances for the alignment of the emitters and detectors 103, 103', along the normal axis 107 can be improved. The alignment can thus be both improved, and facilitated as discussed above. The latter advantage also provides for facilitated and less costly mass production of the touch sensing apparatus 100 and the various touch base display systems in which it may be implemented.

The substrate 106 may extend at least partly above the touch surface 102, whereby the plurality of light emitters and detectors 103, 103', are connected to a portion 109 of the substrate extending above the touch surface 102. This further provides for achieving a more robust alignment of the emitters and detectors 103, 103', relative to the light transmissive panel 101, by being directly joined to the substrate 106, and thereby simultaneously arranged above the touch surface 102. It may be conceivable however that the emitters and detectors 103, 103', are connected to the substrate 106 via connection elements (not shown) extending between the substrate 106 and to a position above the touch surface 102.

The substrate 106 may be fixed to a carrier 110 mounted around the perimeter 104 of the light transmissive panel 101, as schematically illustrated in FIGS. 1-2. By directly joining the substrate 106 to the carrier 110 provided around the perimeter 104, the assembly of the touch sensing apparatus 100 may be further facilitated, as the amount of components can be kept at a minimum. For example, the substrate 106 can be accurately fixed in relation to the carrier 110, due to the small tolerances possible in the direction of the substrate 106 aligned in parallel with the normal axis 107 in FIG. 1a, as discussed above. The carrier 110 may for example comprise a cavity 116, as discussed further below, being precisely dimensioned to accommodate the width of the substrate 106 along the direction 107', i.e. the short-side of the substrate 106. Then, accurate positioning of the emitters and detectors 103, 103', in relation to the light transmissive panel 101 is possible as the carrier 110 is mounted around the perimeter 104 thereof. The carrier 110 may extend substantially in the direction 107' parallel with the normal axis 107, as with the substrate 107, to achieve a compact mounting around the perimeter 104. In some embodiments the carrier 110 may also be the substrate 106 or the emitters and detectors 103, 103' are mounted directly to the carrier 110.

Having the substrate 106 fixed to the carrier 110 allows also for having the carrier 110 wired as an electrical ground reference layer of the substrate 106.

The carrier 110 may be arranged to at least partly enclose edges 111 of the light transmissive panel 101, as shown in the example of FIG. 1a. This provides for further increasing the robustness of the touch sensing apparatus 100, and improving the accuracy of the alignment of the emitters and detectors 103, 103', in relation to the light transmissive panel 101 since the carrier 110, having the emitters and detectors 103, 103', fixed thereto, may also be directly supporting the light transmissive panel 101 around the perimeter 104. The carrier 110 may comprise a slot in which the light transmissive panel 101 is fitted around the perimeter 104.

The carrier 110 may comprise fixing elements 112 configured to attach the carrier 110 to a display unit 113, 121. The display unit may comprise a display support 121 and a display panel 113, which collectively is referred to as a display unit in the present disclosure. Having the carrier 110 attachable to the display unit 113, 121, by fixing elements 112, advantageously provides for further facilitating the assembly of the touch sensing apparatus 100 to a display unit, since the carrier 110 can be directly joined to the latter. Alignment is thus facilitated, due to the minimum amount of components needing such alignment to each other. The robustness of the touch sensing apparatus 100 is further improved, while mass production is made less complex due the minimized number of assembly steps. The fixing elements 112 may comprise any elements configured to provide for fixing of the position of the carrier 110 to the display unit 113, 121. In the examples shown in FIGS. 1a, 1b, and 2, the carrier 110 has openings 115, 115', 115", discussed further below, which may be aligned with corresponding openings 127 of a support of the display unit 121, through which mounting elements 114 may be positioned for the fixing. It is conceivable however that the carrier 110 has other types of recesses or protrusions which may interlock with a corresponding mating surface of the display unit 113, 121.

The fixing elements 112 may be configured to fix the position of the substrate 106 in relation to the carrier 110. Thus, besides from fixing the position of the carrier 110 relative to the display unit 113, 121, the fixing elements 112 may also fix or at least support the position of the substrate 106 in relation to the carrier 110. It is conceivable that the substrate 106 may first be arranged in relation to the carrier 110, and the fixing elements 112 may be arranged to support and strengthen the fixing therebetween, while simultaneously fixing the carrier 110 to the display unit 113, 121. This may further provide for increasing the stability and ultimately accuracy of the touch sensing apparatus 100. From a similar aspect, the fixing elements 112 may be configured to fix the position of the substrate 106 in relation to the display unit 113, 121. This may be seen as a consequence from the above, i.e. the fixing elements 112 contributing to the fixing of the substrate 106 to the carrier 110, which in turn is fixed to the display unit 113, 121. It is however conceivable that the fixing elements 112 may fix the substrate 106 directly to the display unit 113, 121, in which case the carrier 110 may act as a further support for the substrate 106.

In one example, as discussed further below, the substrate 106 may comprise second openings 118 which provides for such fixing or support. As mentioned, this may further provide for increasing the stability and ultimately accuracy of the touch sensing apparatus 100.

Figure 3:
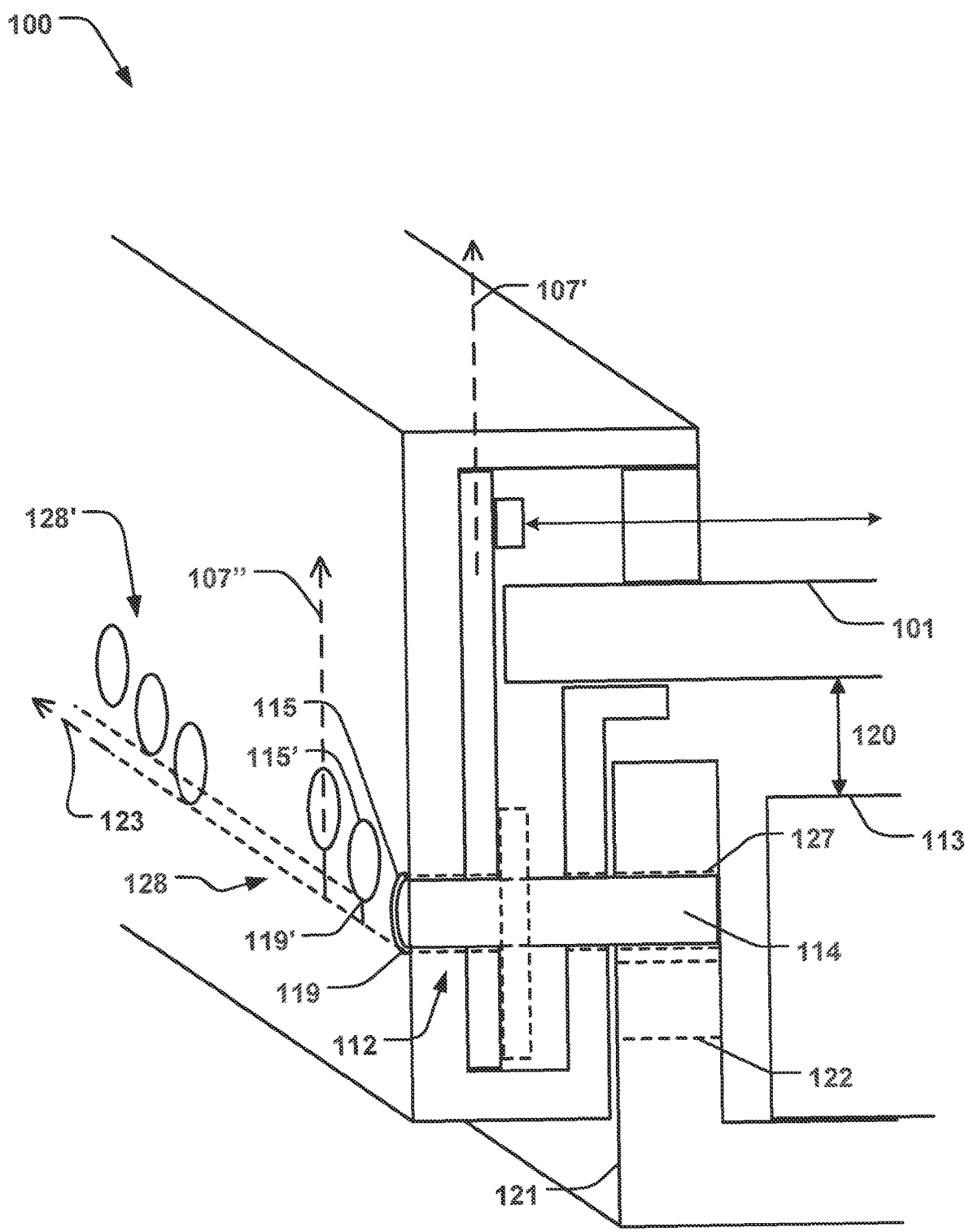
FIG. 3 is a schematic illustration, in a perspective side view, of a touch sensing apparatus according to one example.

The fixing elements 112 may be configured to interlock with a mounting element 114 for locking the position of the carrier 110 and/or the substrate 106 to the display unit 113, 121. FIGS. 2-3 show examples of having an elongated mounting element 114 joining the carrier 110 and/or the substrate 106 to the display unit 113, 121. The mounting element 112 may however comprise any fastening element configured to exert a force between the carrier 110 and/or the substrate 106 to the display unit 113, 121, such as pins, bolts, screws, clips, clamps, locks, bars, rods, anchors, latches, clasps.

The fixing elements 112 may comprise openings 115, 115', 115", as illustrated in FIGS. 2-3. The carrier 110 may form a cavity 116 having walls 117 at least partly enclosing the substrate 106, illustrated in the example of FIG. 2. This may provide for increased stability of the fixing of the position of the substrate 106 in relation to the carrier 110. At least one of the walls 117 may comprise at least one of the openings 115, 115', 115", as further illustrated in FIG. 2. Being able to directly fix the walls 117 of the carrier 110 enclosing the substrate 106 to the display unit 121, 113, provides for further simplifying manufacturing, and at the same time further increase the accuracy of the alignment of e.g. the emitters and detectors 103, 103', in relation to the light transmissive panel 101, since the minimized number of intermediate mounting components improves tolerance control. I.e. build-up of mounting errors in each assembly step is reduced and controlled. It is conceivable that the walls 117 may be fixed to the display unit 113, 121, by other fixing elements 112, such as recesses or protrusions interlocking with correspondingly mating surfaces of the display unit 113, 121, and/or fastening elements as exemplified above.

The fixing elements 112 may comprise openings 115, 115', 115", 118, arranged in the carrier 110 and in the substrate 106. First openings 115, 115', 115" of the carrier 110 may be aligned with second openings 118 of the substrate 106, as illustrated in the example of FIG. 2. The first and second openings 115, 115', 115", 118 may be configured to receive a mounting element 114 configured to lock the position of the carrier 110 and/or the substrate 106 to the display unit 113, 121. This provides for further facilitated and improved alignment and assembly, and increased robustness. In the example of FIG. 2, the carrier 110 encloses the substrate 106 such that two opposite openings 115, 115", of the carrier are arranged on either side of the substrate 106, but it is conceivable that the carrier 110 may be arranged on one side only of the substrate 106.

The carrier 110 may be configured to be attachable to the display unit 121, 113, at an adjustable position 119, 119', along a direction 117" parallel to the normal axis. A distance 120 between the light transmissive panel 101 and the display unit 113 along the normal axis 107 may thus be variable upon attaching the carrier to the display unit 113, 121 at at least two different adjustable positions 119, 119'. For example, turning to FIG. 3, the carrier 110 is attached at a first position 119 to the support of the display unit 121, via fixing unit 112. The first position 119 provides for the given distance 120 between the panel of the display unit 113. The distance 120 may then be decreased by instead attaching the carrier 110 at a second position 119' which is off-set with respect to the first position 119 in the positive direction of the normal axis 107, or the direction 107'' as illustrated in FIG. 3. If the fixing point to the support of the display unit 121 remains constant, e.g. at the opening 127 of a support 121 as illustrated, the carrier 110 will be moved in the opposite direction to the normal axis 107 and the distance 120 will be decreased. Having the carrier 110 being attachable to the display unit 121, 113, at an adjustable position 119, 119', along a direction 117'' parallel to the normal axis 107, thus provides for simple and efficient adjustment of the position of the light transmissive panel 101.

Besides from overall controlling the distance 120, as discussed, such adjustment provides for efficiently controlling and varying the curvature of the light transmissive panel 101. I.e. varying the distance 120 as discussed at a second intermediate location 128', between opposite ends of the carrier 110, along the longitudinal direction 123, while maintaining the distance 120 at the opposite ends, such as at a first location 128, will affect the curvature of the carrier 110, and thereby the curvature of the light transmissive panel 101. E.g. decreasing the distance 120 at the second location 128' can produce a more concave shape, i.e. a decreased radius of curvature, of the carrier 110 and the light transmissive panel 101, in the direction of the normal axis 107. Increasing the distance 120 between the mentioned opposite ends can instead increase the radius of curvature in the direction of the normal axis 107. The curvature or warping of the light transmissive panel 101 can thus be controlled efficiently an in a facilitated manner, which is advantageous for increasing throughput in mass-production of displays incorporating the touch sensing apparatus 100 while keeping the warp of the light transmissive panel 101 under control. An optimized curvature of the light transmissive panel 101 increases the reliability and accuracy of the touch sensing apparatus 100.

The fixing elements 112 may be configured to attach the carrier 110 to the display unit 121 at the adjustable positions 119, 119', along the direction 117'' parallel to the normal axis 107. Thus, the fixing units 112 be arranged at the different adjustable positions 119, 119', to adjust the distance 120 and the curvature of the light transmissive panel 101 while providing for securely attaching the carrier to the display unit 113, 121. The fixing elements 112 may thus be arranged at least at the first and second locations 128, 128', along the longitudinal direction 123 as discussed above, where each of the locations in the longitudinal direction 123 may have at least two adjustable positions 119, 119', as illustrated in the example of FIG. 3.

The openings 115, 115', of the carrier 110 may be separated along a direction 117'' parallel to the normal axis 107, as illustrated in FIG. 3. Alternatively, or in addition, the carrier 110 may be attachable to a plurality of second openings 122 in a display support 121 of the display unit, where the plurality of second openings 122 are separated along the normal axis 107. Thus, the position 119, 119', may be remained fixed while the carrier 110 is attached to the support 121 at the various second openings 122, to adjust the curvature of the light transmissive panel 101 and/or the distance 120 as discussed above. Although the examples in FIGS. 2-3, show openings 115, 115', 115'', 127, it is conceivable that the attachment between the carrier 110 and the display unit 121, 113, is provided by other fixing elements 112 as exemplified above.

The carrier 110 may be formed from a single monolithic piece of material. The structural integrity and the stability of the carrier 110 can thereby be increased, which further optimizes the parameters discussed above with respect to alignment, robustness, ease of assembly etc. One example of a possible process by which the carrier can be formed as a single piece of material is an extrusion process, but it is conceivable that the carrier 110 may be formed from other hot or cold metal or polymer working processes such as drawing, rolling, or molding processes.

Figure 4A:
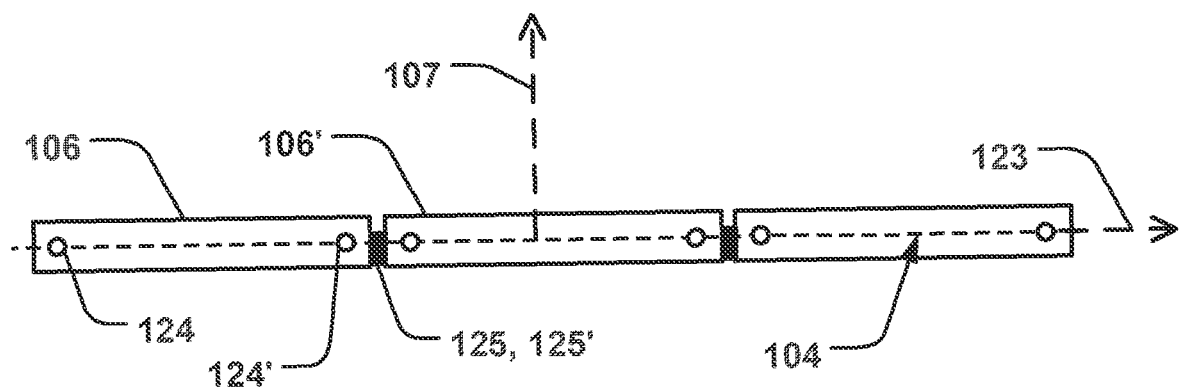
FIG. 4a is a schematic illustration, in a side view of FIG. 2, of a touch sensing apparatus according to one example.

The substrate 106 may extend in a longitudinal direction 123 along the perimeter 104 of the light transmissive panel 101. FIG. 4a illustrates a view of a plurality of substrates 106, 106', extending along the longitudinal direction 123. The light transmissive panel 101 and the carrier 110 holding the substrates have been excluded in the view for clarity of presentation. The substrates 106, 106', may comprise secondary fixing units 124, 124', configured for variably attaching the position of each of the substrates 106, 106', on the carrier 110 along the longitudinal direction 123 and/or in the direction of the normal axis 107. This provides for more accurately adjusting the position of the substrates 106, 106', in relation to the light transmissive panel 101. While each of the substrates 106, 106', may be within tolerances, the accumulated error obtained when several substrates 106, 106' are connected along the longitudinal direction 123 may exceed the total tolerance of the full length of the light transmissive panel 101. Such accumulation of errors may be effectively prevented by having secondary fixing units 124, 124', as elucidated above. The secondary fixing units 124, 124', may be provided on various locations on the substrates 106, 106', to allow for adjusting the position, such as on opposite ends thereof.

Figure 4B:
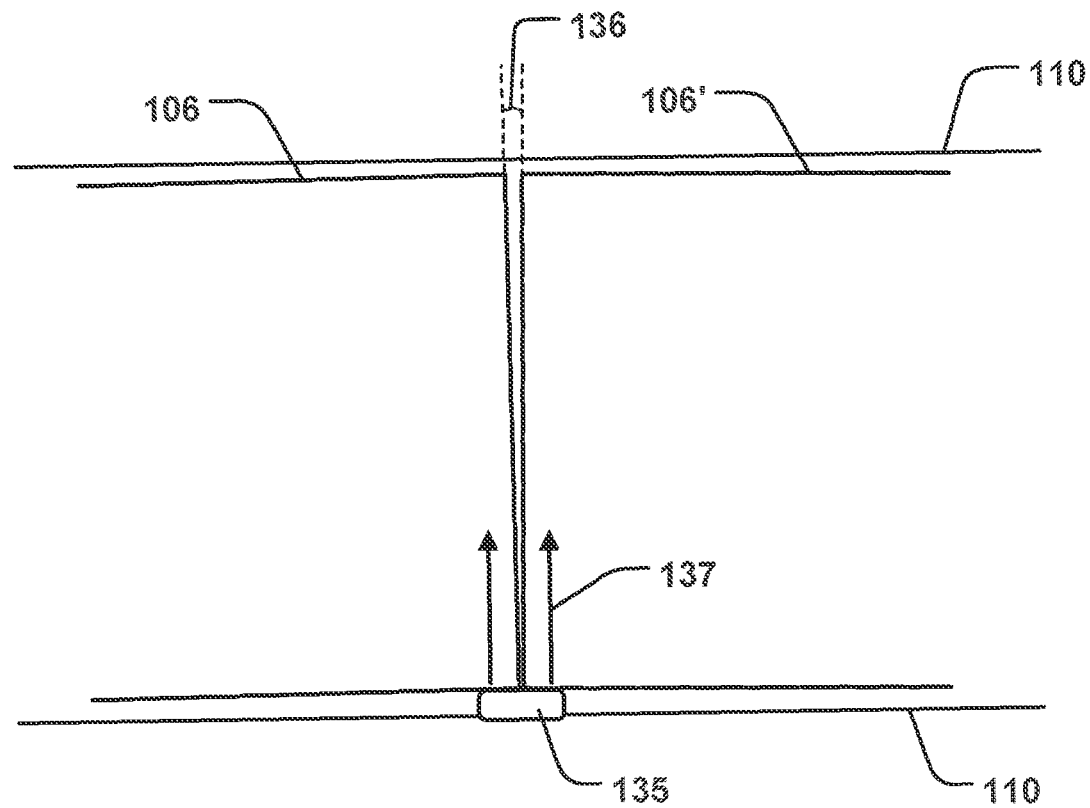
FIG. 4b is a schematic illustration of a magnified section of FIG. 4a, according to one example.

The touch sensing apparatus 100 may comprise vertical alignment units 135 arranged between adjacent substrates 106, 106', extending in a longitudinal direction 123 along the perimeter 104 of the light transmissive panel 101. The vertical alignment units 135 are configured to variably position the adjacent substrates 106, 106', in the direction of the normal axis 107 so that an angle 136 between the adjacent substrates 106, 106', can be adjusted. FIG. 4b schematically illustrates a vertical alignment unit 135 positioned between adjacent substrates 106, 106', to vary the position thereof in the direction of the normal axis 107, i.e. along arrows 137, so that the angle 136 may be set to a desired value. The vertical alignment unit 135 thus provides for facilitating the alignment of the plurality of substrates 106, 106', to e.g. the curvature of the light transmissive panel 101. For example, if the light transmissive panel 101 is concave in the direction of the normal axis 107, initially parallel substrates 106, 106', may be angled to closely follow the concave shape of the light transmissive panel 101 by increasing the angle 136 between the substrates 106, 106', as schematically illustrated in FIG. 4b. The position of the emitters and detectors 103, 103', on the substrates 106, 106', may thus remain at an optimized vertical position relative the light transmissive panel 101 for various curvatures thereof. The vertical alignment unit 135 may comprise various units configured to change the position of the adjacent substrates 106, 106', in the direction of the normal axis 107, such as bolts, screws, pins, or any other elements that can provide an offset at the ends of the substrates 106, 106'.

Figure 4C:
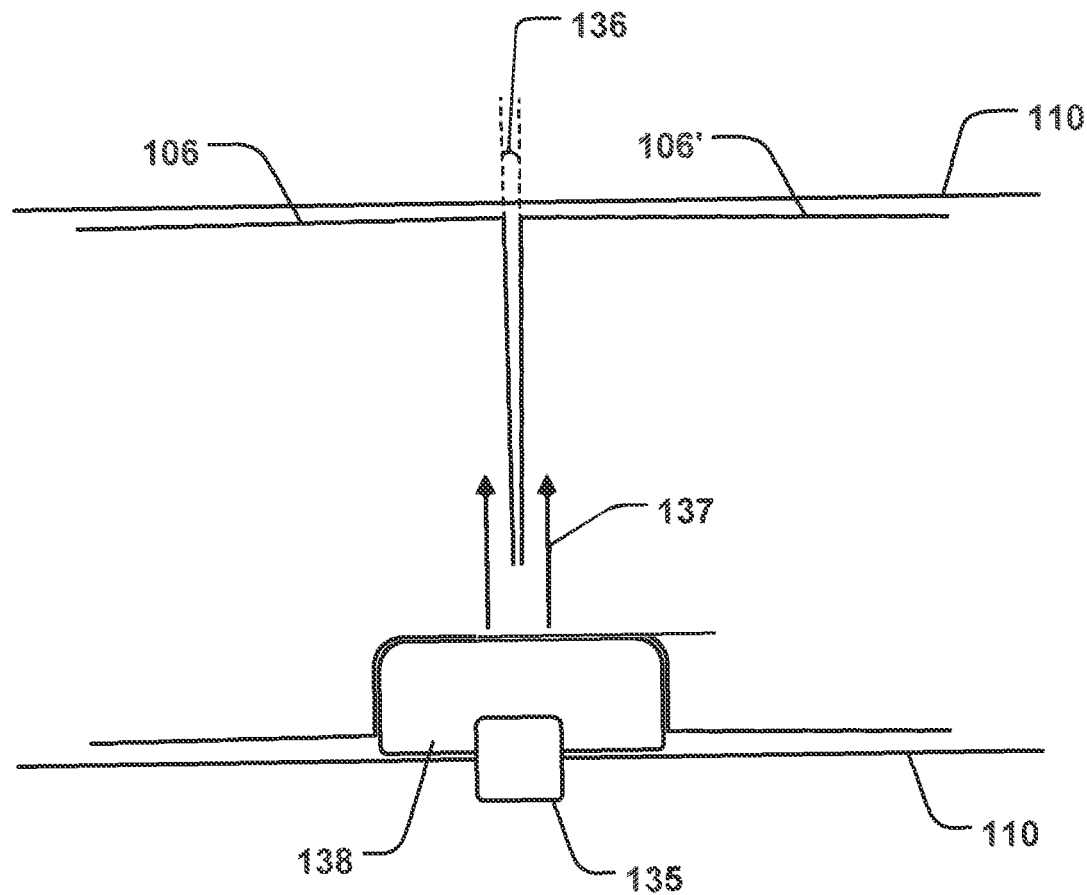
FIG. 4c is a schematic illustration of a magnified section of FIG. 4a, according to one example.

The touch sensing apparatus 100 may comprise force distributing units 138 positioned between adjacent substrates 106, 106', configured to provide a fixing force therebetween, as schematically illustrated in FIG. 4c. The force distributing units 138 may provide for improving and facilitating the fixing of the substrates 106, 106', to the carrier, without the need for dedicated fixing elements such as screws, bolts, etc to each end of respective substrates 106, 106', thereby reducing the amount of such fixing elements, which facilitates the assembly of the touch sensing apparatus 100.

The touch sensing apparatus may thus comprise a plurality of substrates 106, 106', extending in a longitudinal direction 123 along the perimeter 104 of the light transmissive panel 101. A first substrate 106 of the plurality of substrates may comprises a connection unit 125 configured to directly interlock with a subsequent connection unit 125' of a subsequent substrate 106' when arranged adjacent said subsequent substrate, as schematically illustrated in FIG. 4a. It is thereby possible to directly connect subsequent substrates 106, 106', and eliminate the need for intermediate connectors, which further provides for facilitating the assembly of the touch sensing apparatus 100.

Figure 5A:
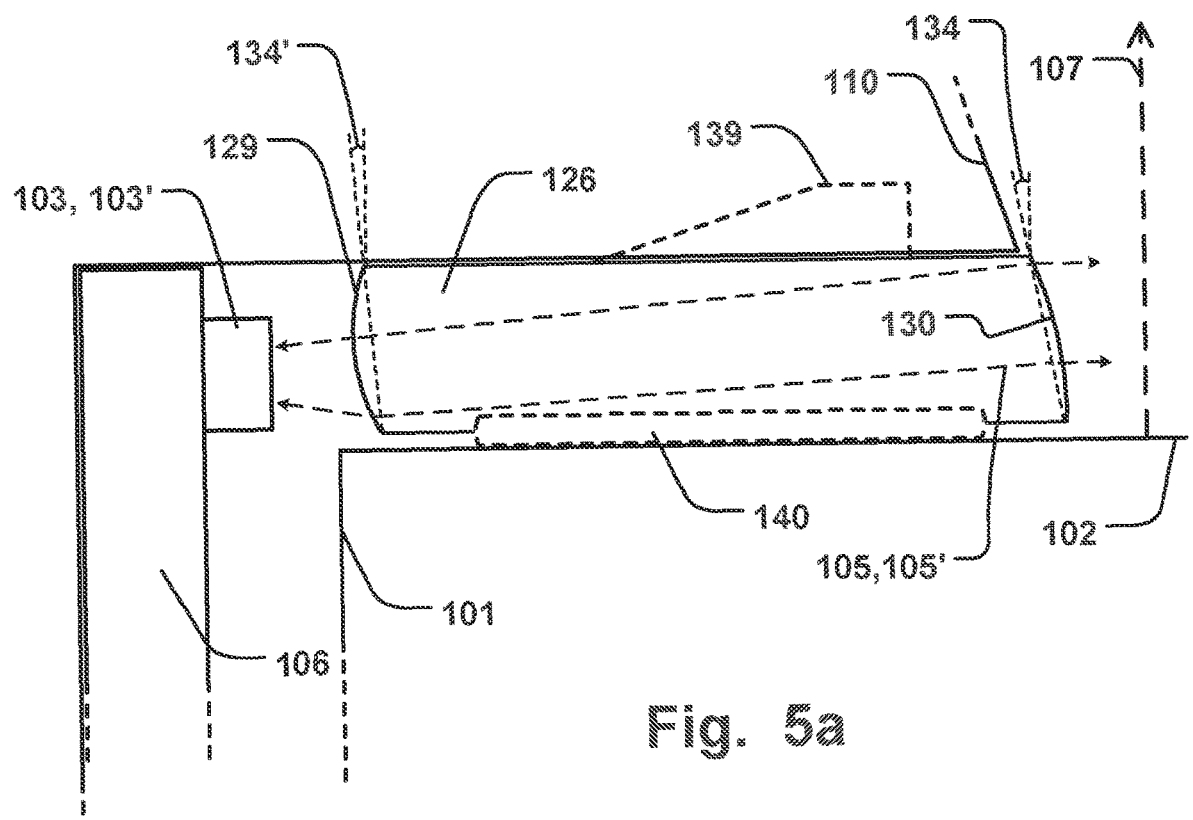
FIG. 5a is a schematic illustration, in a cross-sectional side view, of a touch sensing apparatus according to one example.
Figure 5B:
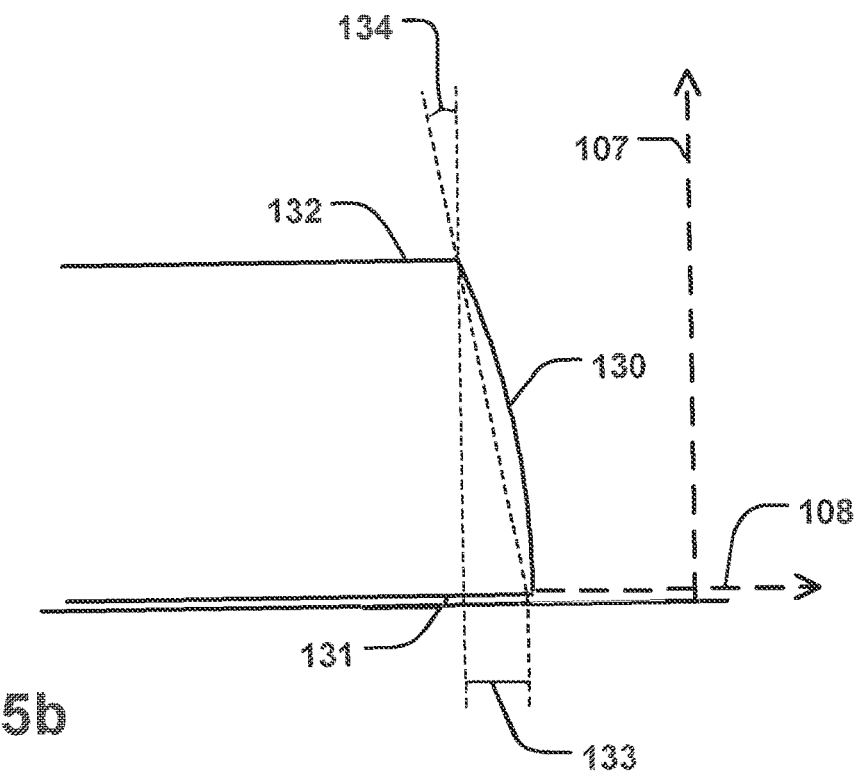
FIG. 5b is a schematic illustration of a magnified section of FIG. 5a, according to one example.

The touch sensing apparatus 100 may comprise a sealing window 126 as schematically illustrated in FIGS. 5a-b. The sealing window 126 may be arranged around the perimeter 104 of the light transmissive panel 101. The sealing window 126 may comprise a first surface 129 facing the light emitters 103 or the light detectors 103', and an opposite second surface 130 arranged adjacent the touch surface 102. Emitted or detected light thus propagates between the first and second surface 129, 130. At least one of the first and second surfaces 129, 130, may comprises a light collimating surface 129, 130, configured to collimate light propagating above the touch surface 102. I.e. emitted light 105 will be collimated by the sealing window 126, so that the light propagating above the touch surface 102 will be collimated. Detectors 103' will receive the collimated light which will be focused through a corresponding sealing window 126. As the emitters and detectors 103, 103', are arranged above the touch surface 102 and are connected to a substrate 106 extending in a direction parallel with a normal axis 107, it is possible to provide for a very precise and improved alignment thereof in relation to the sealing window 126, which allows for achieving collimated light in a highly optimized manner, and an associated increase in signal strength since more of the emitted light can be collected by the detectors 103'. The emitted light is collimated in a direction parallel with the plane 108 in which the light transmissive panel 101 extends. Collimating the light with sealing window 126 also allows for reducing the aperture of the sealing window 126, i.e. the thickness of the sealing window 126 in the direction of the normal axis 107, while still detecting a sufficient amount of light. This provides for reducing the amount of ambient light reaching the detectors 103', thus improving the signal to noise ratio.

Turning to FIG. 5b, the second surface 130 may extend in the direction of the normal axis 107 between a base surface 131 of the sealing window 126, facing the light transmissive panel 101, and an opposite top surface 132 of the sealing window 126. The base surface 131 may be offset from the top surface 132 along the direction of the plane 108 with an offset distance 133 so that the second surface 130 forms an angle 134 relative the normal axis 107. As further illustrated in FIG. 5b, the second surface may comprise the light collimating surface 130. Thus, in addition to having a convex shape as illustrated in FIG. 5b, the second surface 130 is arranged to assume a tilted configuration as provided by the offset distance 133. Having such angled configuration provides for reducing the impact of Fresnel reflexes. The Fresnel reflexes otherwise generate additional unwanted light paths that will reduce the apparent attenuation on some detection lines, especially when they run parallel to and near a sealing window 126. These Fresnel reflexes may also result in artifacts and false touch information. By having an angled and/or curved second surface 130 of the sealing window 126, the light may instead bounce off the second surface 130 with such an angle so that it leaves the plane 108, and thereby not interfere with the detection of the remaining light.

A sealing window 126 as described above can provide for the advantageous effects as described for touch sensing apparatuses having a plurality of light emitters and detectors arranged in a multitude of configurations, not limited to the configurations described in relation to FIGS. 2 and 3 exemplified above. A touch sensing apparatus 100 is thus provided comprising a light transmissive panel 101 extending in a plane 108 having a normal axis 107, wherein the light transmissive panel defines a touch surface 102. The touch sensing apparatus 100 comprises a plurality of light emitters 103 and detectors 103' arranged along a perimeter 104 of the light transmissive panel, wherein the light emitters are arranged to emit a respective beam of emitted light 105 above the touch surface, wherein the light detectors are arranged to receive detection light 105' from the emitted light. The touch sensing apparatus 100 comprises a sealing window 126 arranged around the perimeter, wherein the sealing window comprises a first surface 129 facing the light emitters or the light detectors and an opposite second surface 130 arranged adjacent the touch surface, whereby the emitted or detected light propagates between the first and second surface, wherein the second surface extends in the direction of the normal axis between a base surface 131 of the sealing window, facing the light transmissive panel, and an opposite top surface 132 of the sealing window, wherein the base surface is offset from the top surface along the direction of the plane with an offset distance 133 so that the second surface forms an angle 134 relative the normal axis, and wherein the second surface comprises a light collimating surface 130 configured to collimate light propagating above the touch surface.

The first surface 129, facing the emitters or detectors 103, 103', may also be angled, with an angle 134', as schematically illustrated in FIG. 5a, to provide for the desired light path from or towards the emitters or detectors 103, 103', respectively. The first surface 129 may also comprise a light collimating surface and have a convex shape towards the emitters or detectors 103, 103', as illustrated in FIG. 5a, in addition to being arranged at an angle 134'. The angles 134, 134', may be in the range of 2-10 degrees relative to the normal axis 107 to provide for a particularly advantageous reduction of Fresnel reflexes. An angle greater than 2 degrees avoids Fresnel reflexes and an angle of less than 10 degrees reduces the light field height.

The sealing window 126 may comprise a fixing element 139 configured to interlock to carrier 110. In the example in FIG. 5a, the fixing element comprises a protrusion 139 arranged to interlock with a corresponding recess in the carrier 110. Mounting and fixing of the sealing window 126 may thus be facilitated and improved since the fixing element 139 may snap into the carrier 110, without needing to have separate fixing units or adhesives joining the sealing window 126 to the carrier 110. In some circumstances, it is preferable not to use an adhesive because the adhesive may not be resilient in high temperatures. Use of an adhesive for fixing the sealing window 126 can be problematic because the uncured adhesive allows for relative movement between the components and precise alignment may be difficult. It is conceivable that the fixing element 139 may comprise any other shape, such as a recess, for interlocking with a corresponding mating surface of the carrier 110.

Alternative embodiments of the sealing window 126 will now be described in reference to FIGS. 7 to 16.

Figure 7:
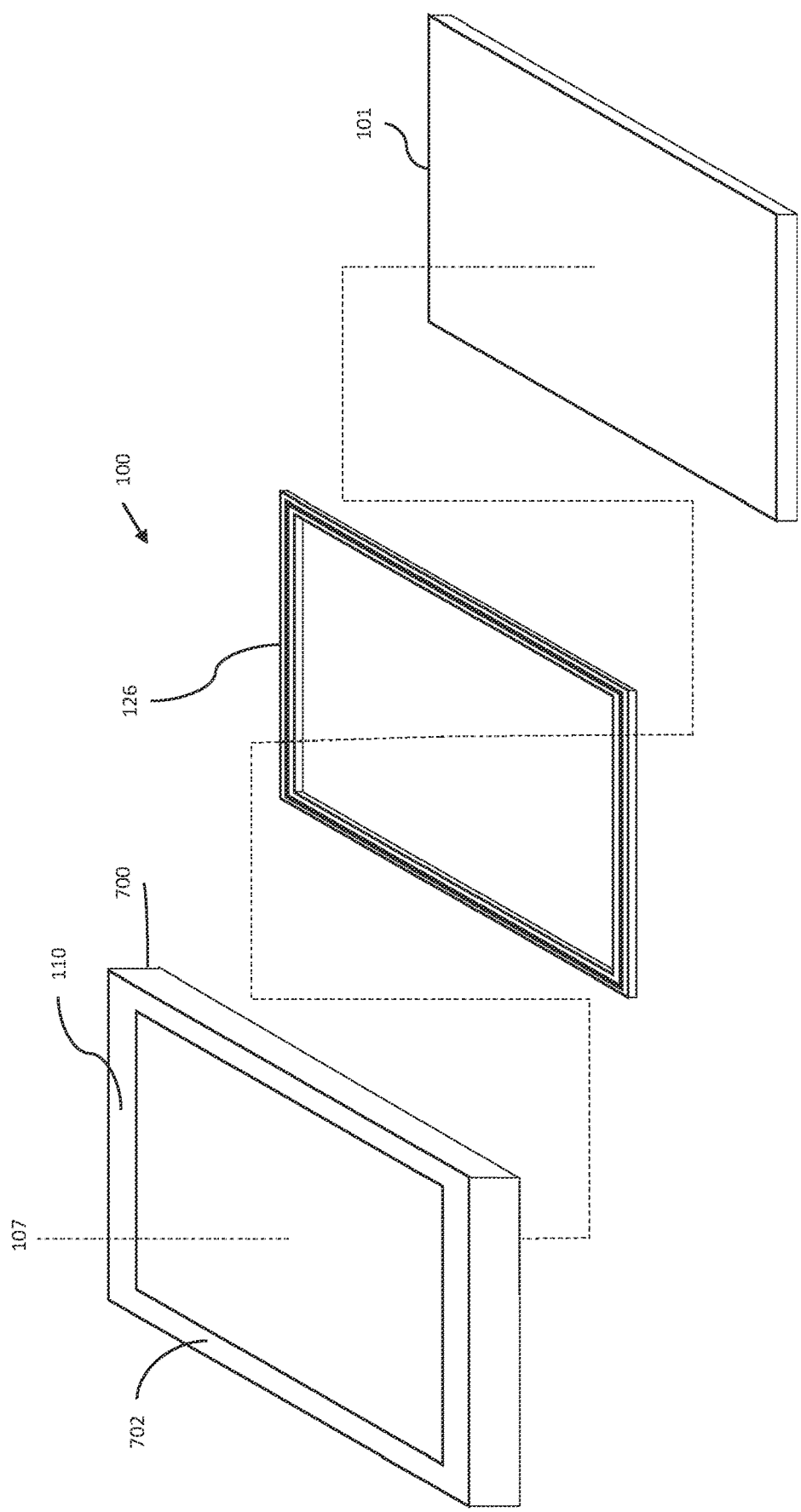
FIG. 7 is a schematic exploded perspective view of different layers of the touch-sensing apparatus according to one example.

FIG. 7 shows an exploded perspective schematic view of the touch sensing apparatus 100. The dotted line shows the normal axis 107 of the touch surface 102 at the center of the light transmissive panel 101. For the purposes of clarity, the exploded perspective view in FIG. 7 shows the separate components side by side, but the dotted line of the normal axis 107 represents the order of how the components stack together. As mentioned previously the carrier 110 may extend substantially in the direction parallel with the normal axis 107. In this way the carrier 110 comprises a downwardly projecting skirt 700 from the upper surface 702.

The sealing window 126 is mountable on the carrier 110 and this will be discussed in further detail below. The sealing window 126 comprises a similar shape to the arrangement of the plurality of light emitters 103 and detectors 103' (not shown in FIG. 7 for the purposes of clarity). The sealing window 126 is mounted such that the plurality of light emitters 103 and detectors 103' are between the sealing window 126 and the skirt 700. As shown in FIG. 7, the sealing window 126 is a rectangular loop structure.

In some embodiments, the sealing window 126 may be formed from a single monolithic piece of material, thus providing for a robust sealing window 126 and a stable attachment to the carrier 110 and the light transmissive panel 101. The sealing window 126 may be formed by an extrusion process. In one embodiment, the sealing window is formed from two separate materials. A first material, such as a dyed PMMA or similar NIR transparent material, is used for a transparent section and a second material, such as a compressible light blocking material, is used for sealing off the E/D compartment. This may be achieved by e.g. using a co-extrusion process.

In other embodiments, the sealing window 126 is formed from a plurality of longitudinal pieces (not shown) and joined together to form a rectangular arrangement. Each longitudinal piece may be a single monolithic piece of material. Considering the sealing window 126 in FIG. 7, the arrangement as shown in FIG. 7 is formed from four pieces of extruded sealing window material 126. The four pieces are then joined together to construct the rectangular loop as shown in FIG. 7. The four pieces of the extruded sealing window 126 can be adhered together with glue, or fastened together with screws, clips, clamps or any other suitable fastener. The glue can be applied and cured before the sealing window 126 is slid into the carrier 110 or the glue can be left to cure once the sealing window 126 is positioned in the carrier 110. Alternatively the four pieces are not fastened or glued together and are held in position with a friction fit.

Figure 8:
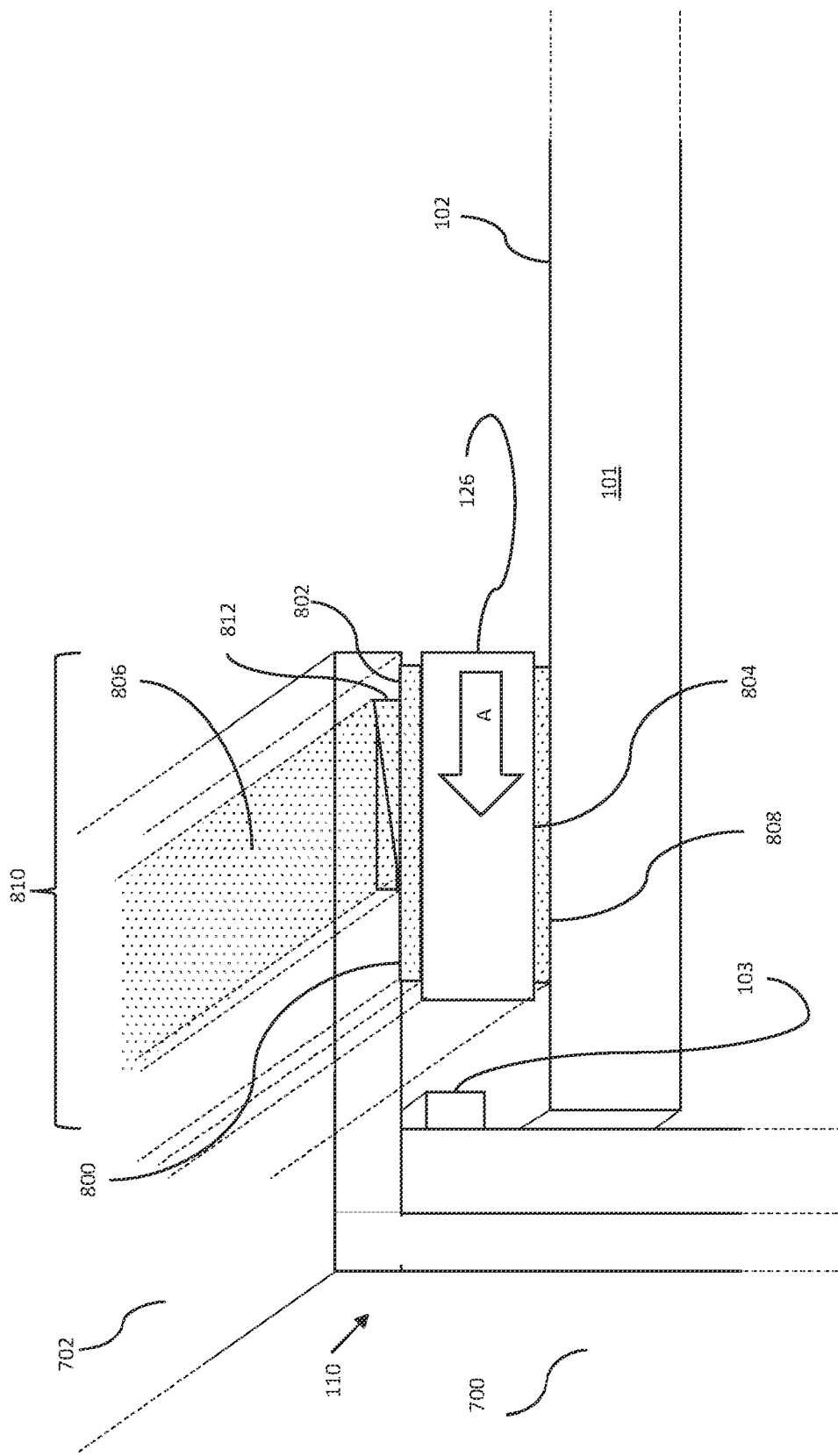
FIG. 8 is a perspective schematic view of through a cross section of the touch sensing apparatus according to one example.

The sealing window 126, once assembled, is sandwiched between the upper surface 702 of the carrier 110 and the light transmissive panel 101. In some embodiments, the sealing window 126 is slid into position between the carrier 110 and the light transmissive panel 101. FIG. 8 shows the direction A in which the sealing window 126 is moved with respect to the carrier 110 and the light transmissive panel 101. In this embodiment the sealing window 126 is slid in a direction parallel with the plane of the light transmissive panel 101. In other embodiments, discussed in more detail below, the sealing window 126 can be inserted into the carrier 110 in a different direction such as parallel to the normal axis 107 and perpendicular to the touch surface 102.

In some embodiments the light transmissive panel 101 is not required to be light transmissive. For example the touch surface 102 can be on a medium through which light does not propagate. In some embodiments the touch surface 102 can be part of a surface which does not require light from a display unit 113, 121 to be visible there through. That is, the touch sensing apparatus 100 is remote from the display unit 113, 121 and the display unit 113, 121 is not stacked together with the other components as shown in FIG. 7. In this way the light transmissive panel 101 can be considered to be a panel 101. For the purposes of clarity, the panel 101 has been referred to as a light transmissive panel 101, but all the embodiments are also applicable to a panel comprising an opaque or light blocking material.

Turning to FIG. 8, the construction of the carrier 110, the sealing window 126 and the light transmissive panel will now be discussed in more detail. FIG. 8 shows a partial perspective cross-sectional view of the touch sensing apparatus 100. In particular FIG. 8 is magnified to show the arrangement between the carrier 110, the sealing window 126 and the light transmissive panel 101.

The sealing window 126 comprises a dual purpose. Firstly, the sealing window 126 provides sealing around the perimeter 104 of the light transmissive panel 101 and protects the emitters and detectors 103, 103' and the edge of the light transmissive panel 101. This means that the sealing window 126 prevents ingress of dirt, water and other contaminants into the interior of the touch sensing apparatus 100. This helps protect the internal components such as the plurality of emitters and detectors 103, 103'. Secondly, the sealing window 126 allows light from the emitters and detectors 103, 103' to propagate therethrough. In some embodiments, as discussed in reference to FIG. 5a, the sealing window can optionally comprise optical elements for refracting, deflecting, diverting or focusing the light beams therethrough. However in other embodiments, the sealing window is optically passive and does not comprise any optical elements for refracting, deflecting, diverting or focusing the light beams therethrough.

As can be seen from FIG. 8, an upper sealing surface 800 of the sealing window 126 engages with an interior underside surface 802 of the carrier 110. The upper surface 702 of the carrier 110 is arranged to project over the light transmissive panel 101. In this way the carrier 110 overlaps a portion of the light transmissive panel 101 around the perimeter of the light transmissive panel 101. The portion 810 of the upper surface 702 that overlaps with the light transmissive panel 101 is indicated by a bracket in FIG. 8. The overlapping portion 810 of the carrier 110 provides protection for the perimeter light transmissive panel 101 from shock and other physical forces. The overlapping portion 810 also provides an overhang on which the sealing window 126 can be mounted. The interior underside surface 802 of the carrier is an opposite face to the upper surface 702. A lower sealing surface 804 of the sealing window 126 engages with the touch surface 102.

In order to aid the sealing, the sealing window 126 optionally comprises one or more deformable seals or integral gaskets 806, 808 mounted on the upper sealing surface 800 and the lower sealing surface 804 respectively. The deformable seals 806, 808 are arranged to deform when the light transmissive panel 101 is urged towards the carrier 110. The deformable seals 806, 808 are extruded along the longitudinal length of the sealing window 126. In some embodiments the deformable seals 806, 808 are integral with the sealing window 126. As mentioned previously, in some embodiments the deformable seals 806, 808 can be manufactured at the same time as the sealing window 126 in a co-extrusion process. Alternatively the deformable seals 806, 808 are mounted and adhered to the sealing window 126 after the sealing window 126 has been extruded. In some embodiments the deformable seals 806, 808 are made from a thermoplastic elastomer (TPE). The deformable seals 806, 808 can be colored black to block transmission of light from the sealing window 126. The deformable seals 806, 808 can be any suitable color or material for absorbing light and minimizing light in-coupling.

In some embodiments the sealing window 126 is configured to be mounted between two surfaces for sealing and protecting the emitters and detectors 103, 103' from the outside environment. In some embodiments the sealing window 126 is arranged to seal against the touch surface 102 and the interior underside surface 802 of the carrier 110. In other embodiments the sealing window 126 can be mounted between any other surface to provide a sealed cavity 116 around the emitters and detectors 103, 103'. In some embodiments the sealing window 126 seals between the interior underside surface 802 and other surface. The other surface does not need to be the touch surface 102. Instead the other surface is another interior surface of the carrier 110 such as a surface on which the substrate 106 is mounted on. In some other embodiments the sealing window 126 is mounted and sealed against another components and neither of the touch surface 102 and the interior underside surface 802. In some embodiments the sealing window 126 is sealable against at least one surface of the touch sensing apparatus 100 for sealing a cavity 116 around the plurality of light emitters and detectors 103, 103'. In some embodiments the carrier 110 may also be the substrate 106 or the emitters and detectors 103, 103' are mounted directly to the carrier 110.

In some embodiments the sealing window 126 comprises at least one reference surface 812 for aligning the sealing window 126 with respect to the carrier 110. The reference surface 812 will be discussed in further detail with respect to FIG. 9 for the purposes of clarity.

Figure 9:
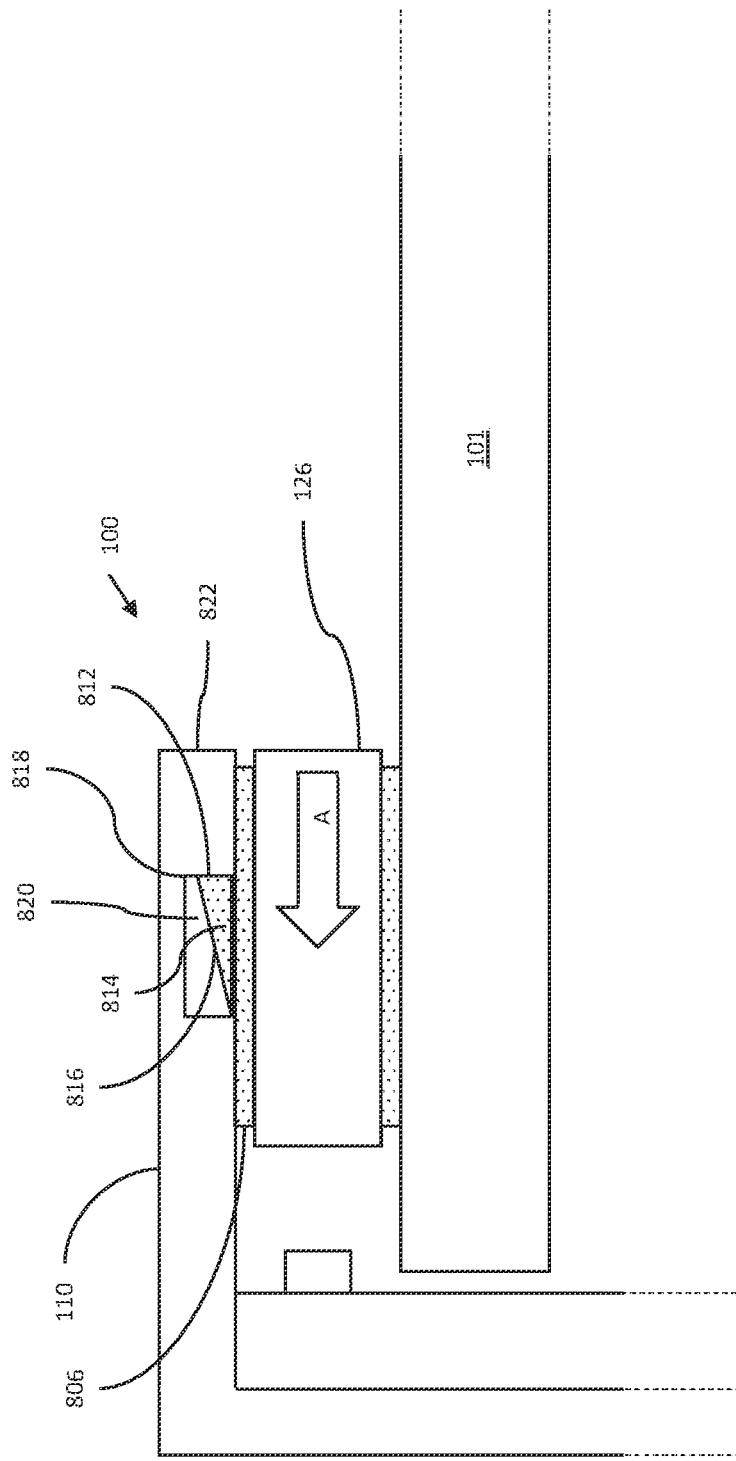
FIG. 9 is a cross sectional view of the touch sensing apparatus according to one example.

FIG. 9 is a schematic cross-sectional view of the touch sensing apparatus 100. The sealing window 126 is inserted between the light transmissive panel 101 and the carrier 110. The upper deformable seal 806 comprises a reference surface 812 for aligning the sealing window 126 with respect to the carrier 110. The upper deformable seal 806 comprises a projection 814 which projects upwardly from the upper deformable seal 806 and the sealing window 126. In this way, the reference surface 812 is upright with respect to the sealing window 126. The projection 814 also optionally comprises a chamfer 816 in addition to the reference surface 812.

The chamfer 816 means that the deformable upper seal 806 does not snag on the carrier 110 when the sealing window 126 is inserted between the carrier 110 and the light transmissive panel 101. Accordingly as the sealing window 126 is pushed into place, the chamfer 816 urges against the interior underside surface 802 of the carrier 110. Initially, the deformable upper seal 806 is squashed between the carrier 110 and the light transmissive panel 101 when the sealing window 126 is being forced between the carrier 110 and the light transmissive panel 101.

The sealing window 126 is pushed towards a notch 820 located in the interior underside surface 802 of the carrier 110. In some embodiments, the notch 820 is a groove that extends around the periphery of the carrier 110. The notch 820 comprises a reciprocal reference surface 818 for aligning with the reference surface 812 of the projection 814. In particular, the notch 820 is a reference point for indicating that the sealing window 126 is inserted underneath the overlapping portion 810 sufficiently to form a seal and protect the internal components of the touch sensing apparatus 100. The notch 820 is positioned a predetermined distance from the edge 822 of the carrier 110. In some embodiments the predetermined distance is at least half the width of the sealing window 126.

When the sealing window 126 pushed sufficiently between the carrier 110 and the light transmissive panel 101, the deformed projection 814 is located within the notch 820. At this point when the sealing window 126 is located in the correct position with respect to the carrier 110, the reference surface 812 abuts against a reciprocal reference surface 818 in the notch 820 in the carrier 110.

The compressed projection 814 resiles and expands once located in the notch 820. In this way, the project 814 snaps into position and positively engages with the notch 820. When the sealing window 126 is located and the projection 814 snaps into place, the sealing window 126 makes an audible "click". Additionally or alternatively the snapping of the projection 814 into position provides a tactile feedback during assembly that the sealing window 126 is seated correctly.

The size of the notch 820 is slightly larger than the dimensions of the projection 814. Accordingly the projection 814 fits snugly within the notch 820. This means that the frictional forces between the carrier 110, the light transmissive panel 101 and the sealing window 126 are sufficient to hold the sealing window 126 in place. Adhesive is not required to fix the sealing window 126 in place. However in some embodiments adhesive is optionally used in addition to the snap-fit positive engagement.

In some embodiments the reference surface 812 abuts against the reciprocal reference surface 818. This means that the sealing window 126 opposes the direction A by virtue of the engaged reference surfaces 812, 818. Removal of the sealing window 126 may only be achieved with a special tool which compresses the projection 814.

Once the sealing window 126 has been seated correctly in the carrier 110, the reference surfaces 812, 818 maintain the alignment between the carrier 110 and the sealing window 126. The deformable seals 806, 808 maintain the relative position of the sealing window 126 with respect to the carrier and prevents lateral movement in a plane parallel to the light transmissive panel 101. Furthermore, the reference surfaces 812, 818 ensure that the sealing window 126 is maintained at a certain height above the touch surface 102.

Figure 10:
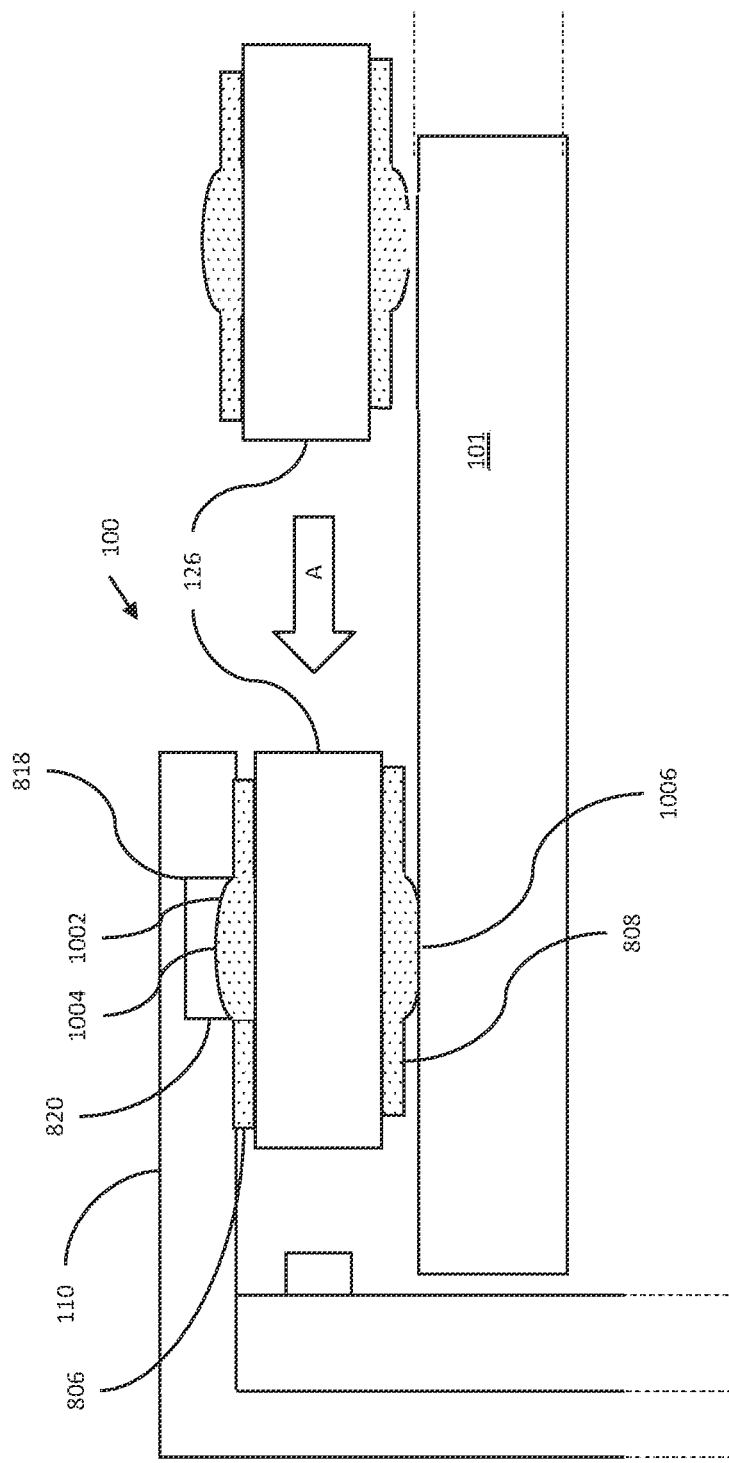
FIG. 10 is a cross sectional view of the touch sensing apparatus according to one example.

The shape and size of the deformable seal 806, 808 can be varied. Another embodiment with such a variation is shown in FIG. 10. FIG. 10 shows a cross sectional side view of the touch sensing apparatus 100. The arrangement is the same as shown in reference to FIGS. 8 and 9, except the cross sectional shape of the deformable seal 806, 808 is different. In this embodiment the projection 1002 comprises a curved upwardly projecting bulge 1002 on the upper deformable seal 806. The bulge 1002 comprises a curved reference surface 1004 which engages with one or more reciprocal reference surfaces 818 of the notch 820. The curved reference surface 1004 functions in a similar way to the chamfer 814 as described in reference to the previous embodiment when inserting the sealing window 126 between the light transmissive panel 101 and the carrier 110. The bulge 1002 has dimensions which are substantially the same width as the width of the notch 820 so that the sealing window 126 does not experience lateral movement in a direction parallel with the plane of the light transmissive panel 101. The lower seal 808 optionally comprises a similar bulge 1006 for engaging and sealing against the touch surface 102. By making the upper seal 806 and the lower seal 808 have the same cross section, manufacture can be simplified because the same die (not shown) can be used during extrusion of the deformable seals 806, 808.

Advantageously the shape of the projection 1002 means that the sealing window 126 can be removed with a similar magnitude of force to the force needed for insertion during assembly. Accordingly removal of the sealing window 126 may not require a tool. This can make maintenance which requires removal of the sealing window 126 easier.

Figure 11:
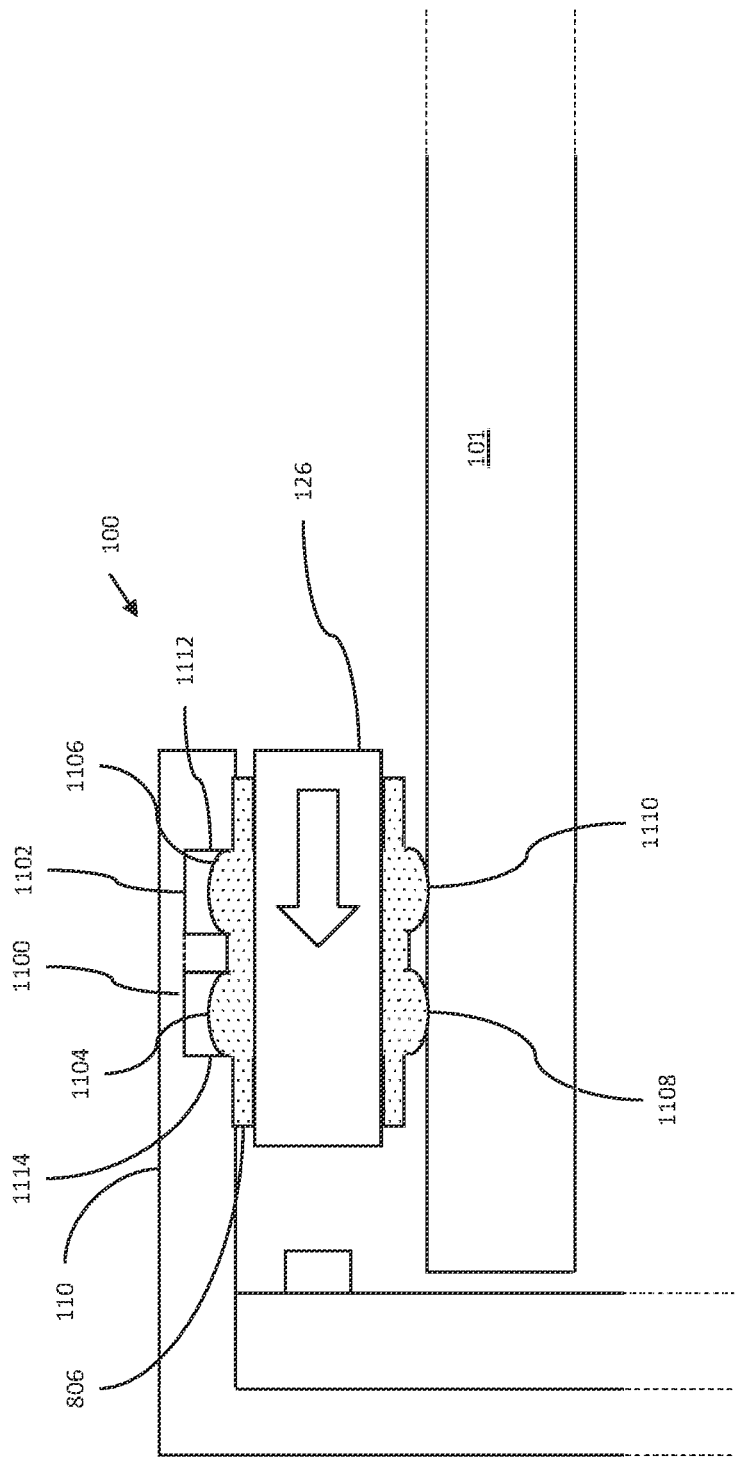
FIG. 11 is a cross sectional view of the touch sensing apparatus according to one example.

Another embodiment is shown in FIG. 11. FIG. 11 shows a cross sectional side view of the touch sensing apparatus 100. FIG. 11 is the same as shown in FIG. 10 except that there is an additional projection and notch. The first notch 1100 and first bulge 1104 are substantially the same as the notch 820 and the bulge 1002 as discussed in reference to FIG. 10. In addition, there is a second notch 1102 and a second bulge 1106. Likewise the lower seal 808 comprises similar first and second bulges 1108, 1110. Having two projecting bulges 1104, 1106 means that there are two points of sealing engagement between the sealing window 126 and the light transmissive panel 101 and the carrier 110 respectively. This means that there will be less rotation of the sealing window 126 about the deformable seal 806, 808. Accordingly, the tolerances needed to accommodate rotational movement of the sealing window about the longitudinal axis of the sealing window can be lower. There is also an increased surface area of the deformable seals 806, 808 and therefore the deformable seals will cool quicker during manufacture.

In another embodiment, the first and second bulges 1104, 1106 engage with a single notch 820 as shown in FIG. 10. The dotted line between the first and second notches 1100, 1102 represents a single notch, similar to the notch 820 in FIG. 10. In this case the first bulge 1104 engages a first reciprocal reference surface 1114 and the second bulge 116 engages with a second reciprocal reference surface 1112. The first and second reciprocal reference surfaces 1114, 1112 are walls of the notch 820.

Figure 12:
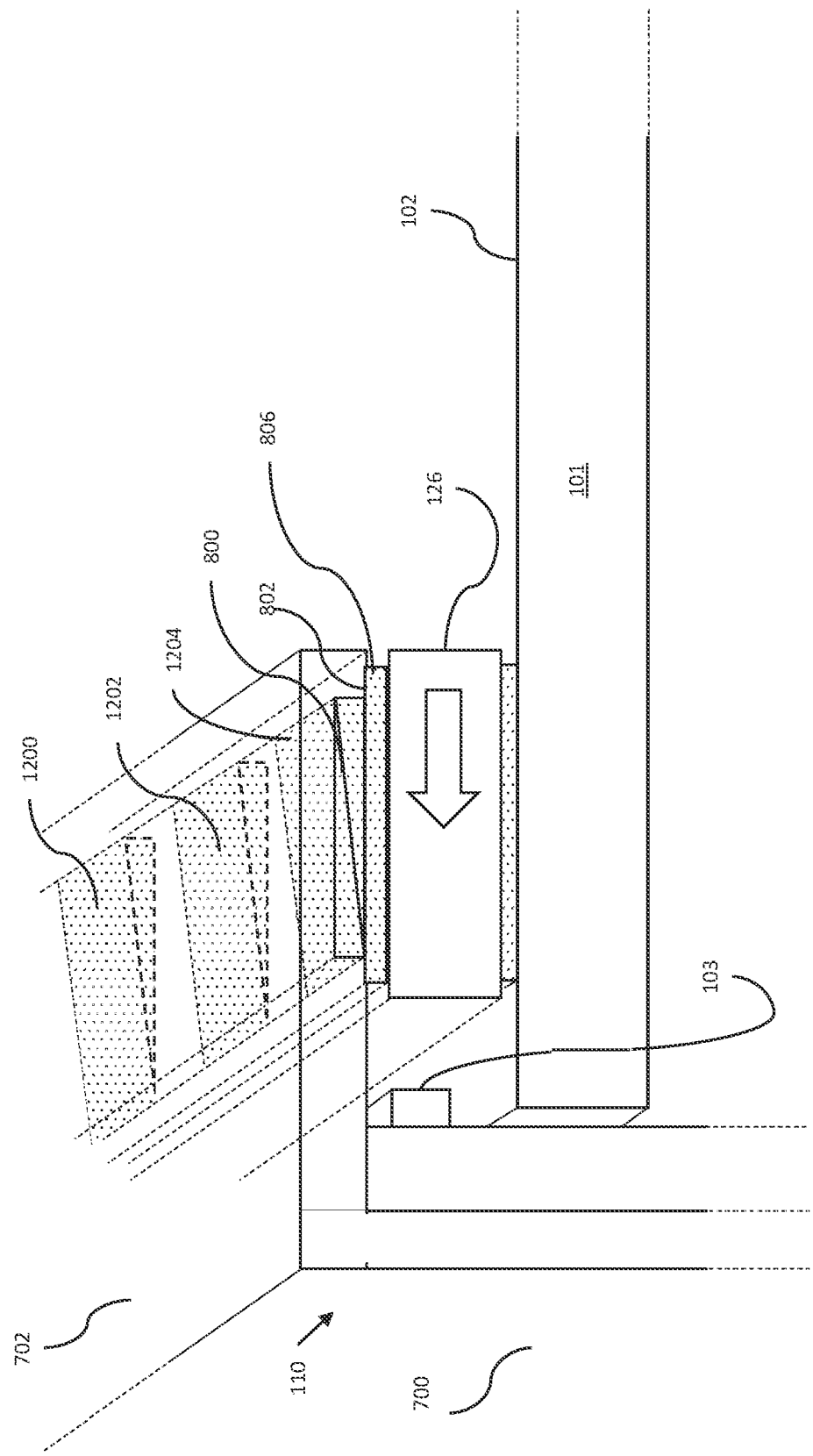
FIG. 12 is a perspective schematic view of through a cross section of the touch sensing apparatus according to one example.

Another embodiment will now be discussed in reference to FIG. 12. FIG. 12 shows a schematic perspective and cross-sectional view of the touch sensing apparatus 100. The arrangement as shown in FIG. 12 is the same as shown in FIGS. 8 and 9 except that the deformable seal 806 comprises a plurality of discrete projections 1200, 1202, 1204. Each of the projections is deformable and is inserted between the light transmissive panel 101 and the carrier 110 in the same way as described with respect to the previous embodiments. The carrier 110 comprises a series of reciprocal recesses (not shown for clarity) to receive a respective projection 1200, 1202, 1204. In this way less deformable material is required to perform the alignment function. The projections may be adhered to the deformable seal material 806 or the projections can be extruded. Each of the projections 1200, 1202, 1204 comprise a reference surface for aligning the projection and the sealing window 126 with the reciprocal recess in the carrier 110. In some embodiments the projections 1200, 1202, 1204 can comprise any suitable cross sectional shape. For example, the projections can comprise an oval curved cross section, similar to the bulges shown in the embodiments discussed in reference to FIGS. 10 and 11.

Figure 13:
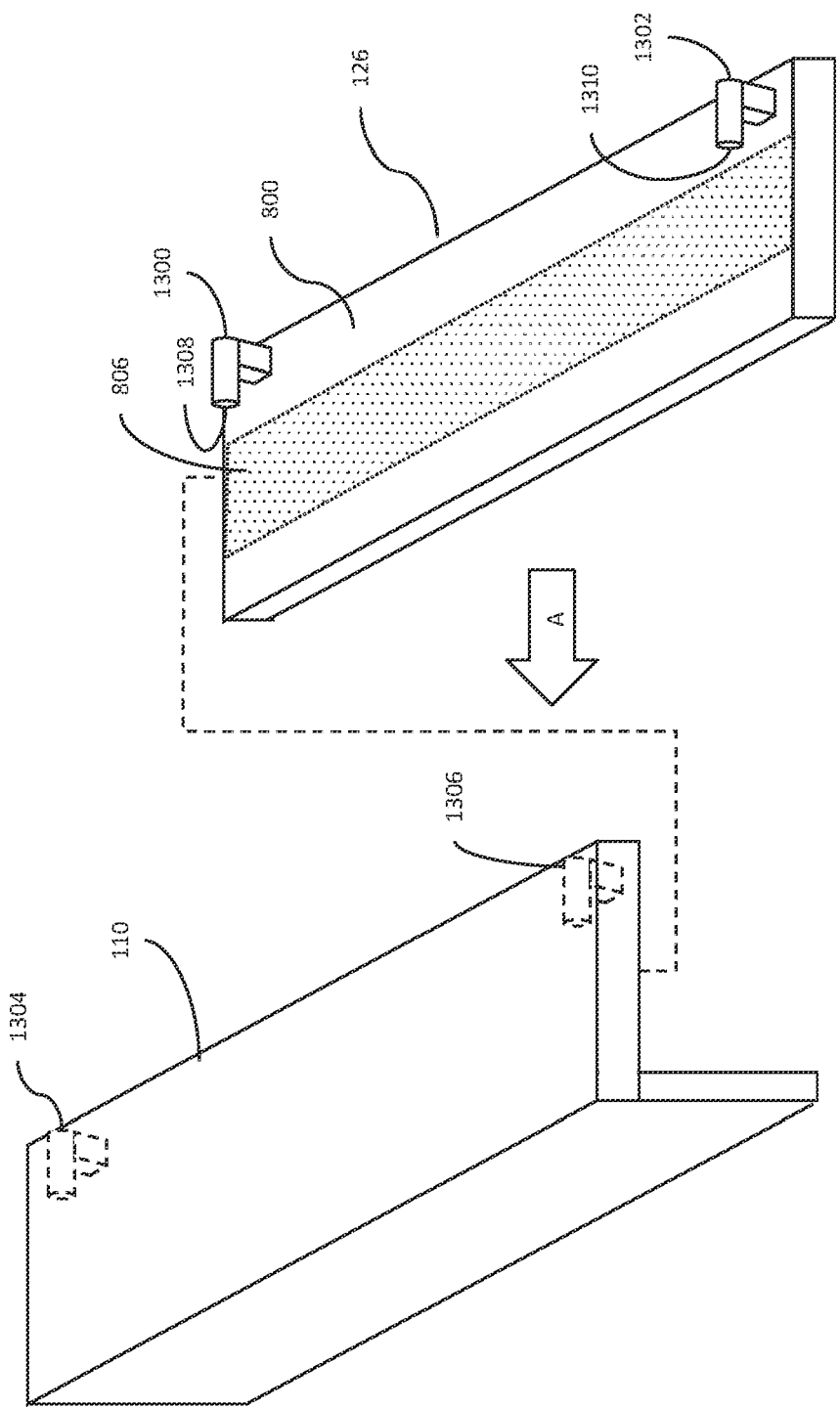
FIG. 13 is a schematic perspective view of the touch sensing apparatus according to one example.

FIG. 13 shows yet another embodiment. FIG. 13 shows a schematic exploded perspective view of the touch sensing apparatus 100. For the purposes of clarity the light transmissive panel 101 is not shown. The sealing window 126 is the same as described in reference to the previous embodiments. The upper deformable seal 806 is mounted on the upper sealing surface 800. In contrast to the previous embodiments, the deformable seal 806 does not comprise upward projections comprising a reference surface. Instead the sealing window 126 comprises positioning pegs 1300, 1302 for engagement in the reciprocal positioning holes 1304, 1306 located in the carrier 110. In this way the reference surfaces are separate from the deformable seal 806. Each of the positioning pegs 1300, 1302 comprises a reference surface 1308, 1310 for aligning the sealing window 126. In this way as the sealing window is slid underneath the carrier 110 in the direction A, the pegs 1300, 1302 slot into the positioning holes 1304, 1306. The holes 1304, 1306 are blind holes and when the reference surfaces 1308, 1310 abut the end of the blind holes 1304, 1306, the sealing window 126 is in the correct position. The holes 1304, 1306 are deep enough such that the sealing window 126 is completely under the carrier 110, similar to the arrangement shown in the previous embodiments.

FIG. 14 shows another embodiment. FIG. 14 shows a cross sectional side view of the touch sensing apparatus 100. The arrangement as shown in FIG. 14 is the same as shown in FIGS. 8 and 9 except that the projection 1400 is formed on the carrier 110 and the notch 1402 is formed in the upper deformable seal 806. In this embodiment the projection 1400 is rigid and downwardly projects from the carrier 110. The notch 1402 is deformable and snaps into position when the notch 1402 is in positive engagement with the projection 1400 and reference surfaces are in engagement. The sealing window 126 is inserted between the carrier and the light transmissive panel 101 in the same way as discussed previously.

In alternative embodiments, the carrier 110, the light transmissive panel 101 and the sealing window 126 are assembled in a different order. The components are the same as described in reference to the previous embodiments. Turning to FIGS. 15a-15d and FIG. 16 the alternative method of assembly will now be discussed.

Figure 15B:
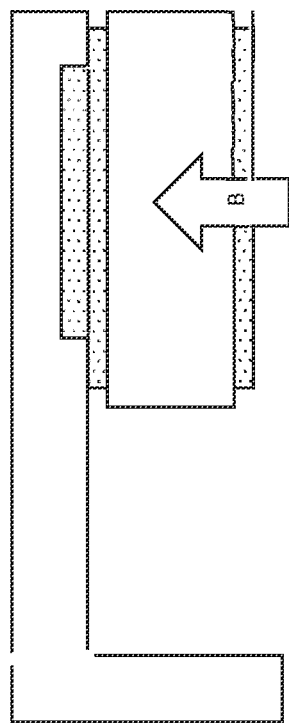
FIGS. 15a to 15d are magnified cross-sectional views of the touch sensing apparatus according to different examples.
Figure 15D:
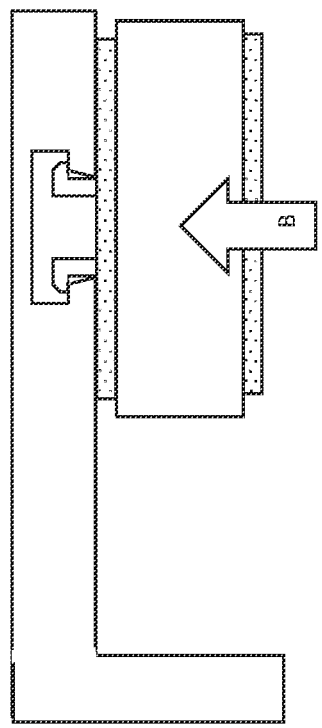
Figure 15A:
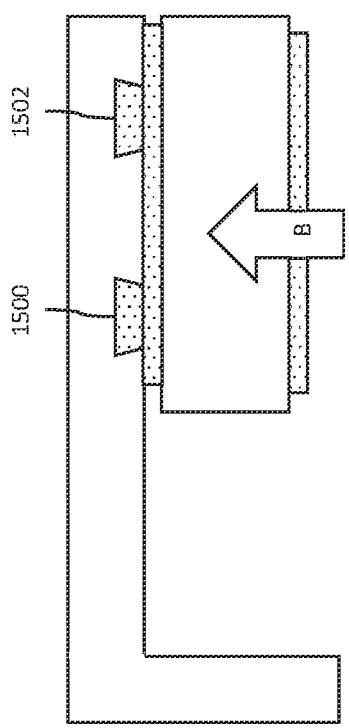

FIGS. 15a-15d show a side cross section of the touch sensing apparatus 100. The light transmissive panel 101 has been omitted for clarity. The sealing window 126 is pushed towards the carrier 110 in direction B. That is, a direction which is parallel to normal axis 107. FIG. 15a shows two deformable projections 1500, 1502 which have a snap-fit engagement with reciprocal grooves in the carrier. The deformable projections 1500, 1502 have a cross sectional shape that snaps into the reciprocal holes when the sealing window is seated correctly in the carrier 110.

FIG. 15b shows a similar arrangement to FIG. 15a except that there is a single projection 1504 which does not have a snap-fit engagement. Optionally, positive engagement is provided by the projection 1504 having a snug friction fit. When the sealing window 126 cannot move any further with respect to the carrier 110, the projection 1504 will abut the reciprocal surface of the hole in the carrier 110 and the sealing window will be seated correctly.

Figure 15C:
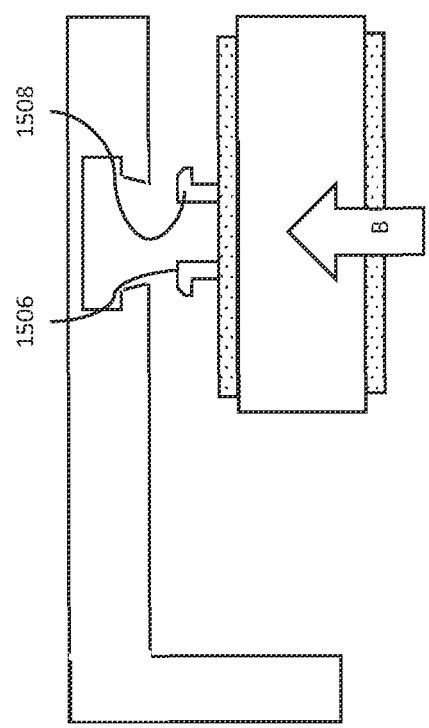

FIGS. 15c and 15d show stepwise engagement of the same arrangement. The deformable seal 806 comprises snap-fit latches 1506, 1508 which bend and snap into place once the sealing window is fully seated in the carrier 110.

Once the sealing window 126 and the carrier 110 are assembled, then the light transmissive panel 101 is mounted in the carrier 110.

FIG. 16 shows a schematic exploded perspective view of the carrier 110 and the sealing window 126. The arrangement as shown in FIG. 16 is the same as shown in FIG. 13, except that the relative movement of the sealing window 126 with the respect to the carrier 110 during assembly is perpendicular. That is, along direction B parallel with the normal axis 107. Similar to the embodiment as shown in FIG. 13, the sealing window 126 comprises a plurality of reference surfaces which are not part of the deformable seal 806. Each of pegs 1600, 1606 and snap-fit latches 1602, 1604 comprises a reference surface for alignment. FIG. 16 shows pegs 1600, 1606 for engagement with holes 1608, 1610. FIG. 16 also shows resiliently deformable latches 1604, 1602 for snap-fit engagement with holes 1612 and 1614.

A further mounting unit 140 may be provided between the sealing window 126 and the light transmissive panel 101, as schematically illustrated in FIG. 5a. The mounting unit 140 may comprise a resilient material that allows the sealing window 126 to assume a secure fixed position relative the light transmissive panel 101. The sealing window 126 may have a corresponding groove into which the mounting unit 140 may be securely positioned.

Figure 6:
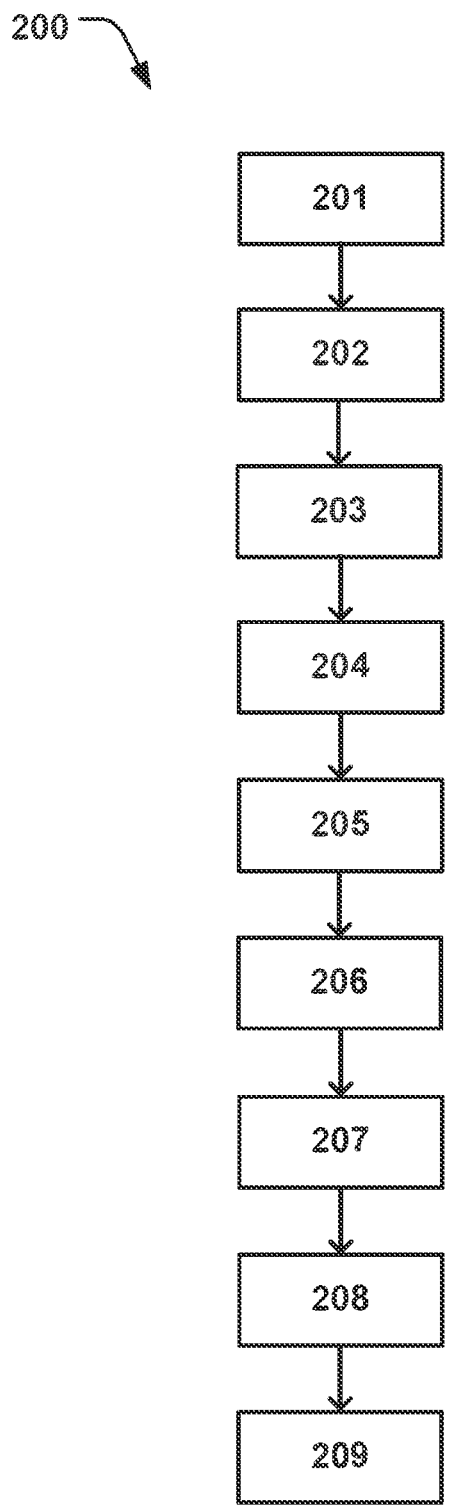
FIG. 6 is a flow chart of a method of assembling a touch sensing apparatus according to one example.

A method 200 of assembling a touch sensing apparatus 100 is provided. FIG. 6 illustrates steps of the method 200. The order in which the steps of the method 200 are described and illustrated should not be construed as limiting and it is conceivable that the steps can be performed in varying order. The method 200 comprises fixing 201 a substrate 106 having a plurality of light emitters 103 and detectors 103' to a carrier 110, and attaching 202 the carrier 110 around a perimeter 104 of a light transmissive panel 101. The method further comprises arranging 203 the substrate to extend in a direction 107' parallel with a normal axis 107 of a plane 108 in which the light transmissive panel 101 extends, whereby the plurality of light emitters and detectors 103, 103', are arranged above the touch surface 102. The method 200 thus provides for a facilitated assembly of the touch sensing apparatus 100 while achieving optimal alignment, robustness, and accuracy as described above in relation to FIGS. 2-3.

As mentioned, the carrier 110 may be formed from a single monolithic piece of material, and the carrier may form a cavity 116 having walls 117 at least partly enclosing the substrate 106. At least one of the walls 117 may comprise openings 115, 115', 115". The method 200 may comprise fixing 204 the carrier 106 to a display unit 121, 113, by fixing mounting elements 114 through the openings 115, 115', 115", thereby providing for the above mentioned advantages.

The method 200 may comprise adjusting 205 a distance 120 between the light transmissive panel 101 and a display unit 113, 121, along the normal axis 107 by attaching 207 the carrier 110 to the display unit 113, 121, at at least two different adjustable positions 119, 119', along a direction 117" parallel to the normal axis 107. Control of the distance 120 is improved and facilitated, and may thereby be more easily optimized to various applications of the touch sensing apparatus 100.

The method 200 may comprise adjusting 208 a radius of curvature of the light transmissive panel 101 in the direction of the normal axis 107 by attaching 209 the carrier 110 to a display unit 113, 121, at at least two different adjustable positions 119, 119', along a direction 117" parallel to the normal axis 107. Control of the curvature of the light transmissive panel 101 is thus improved as described above.

The invention has mainly been described above with reference to a few embodiments. However, as is readily appreciated by a person skilled in the art, other embodiments than the ones disclosed above are equally possible within the scope and spirit of the invention, which is defined and limited only by the appended patent claims.

For example, the specific arrangement of emitters and detectors as illustrated and discussed in the foregoing is merely given as an example. The inventive coupling structure is useful in any touch-sensing system that operates by transmitting light, generated by a number of emitters, inside a light transmissive panel and detecting, at a number of detectors, a change in the received light caused by an interaction with the transmitted light at the point of touch.

What is claimed is:

1. A touch sensing apparatus, comprising:
a curved glass panel comprising a touch surface, the curved glass panel having a radius of curvature;
a plurality of light emitters arranged along a periphery of the curved glass panel;
a support structure positioned around the periphery of the curved glass panel, the support structure comprising a first portion extending over at least a portion of the periphery of the curved glass panel and separated by a space from the curved glass panel;
an optical element fitted in the space between the curved glass panel and the first portion of the support structure, the optical element configured to at least partially seal the plurality of light emitters from contaminants from the touch surface,
wherein the support structure is configured to adjust the radius of curvature of the curved glass panel along at least one side of the curved glass panel, and wherein the curved glass panel is concave.

2. The touch sensing apparatus according to claim 1, wherein the support structure is configured to bend the curved glass panel for said adjustment of the radius of curvature of the curved glass panel.

3. The touch sensing apparatus according to claim 1, wherein the support structure is configured to decrease or increase the radius of curvature of the curved glass panel.

4. The touch sensing apparatus according to claim 1, wherein the support structure forms a cavity having walls enclosing the plurality of light emitters.

5. The touch sensing apparatus according to claim 4, wherein the plurality of light emitters is connected to a substrate, and wherein the cavity is configured to receive the substrate.

6. The touch sensing apparatus according to claim 1, wherein the support structure is formed from a single monolithic piece of material.

7. The touch sensing apparatus according to claim 1, wherein the optical element comprises a protrusion configured to interlock with a recess in the first portion.

8. The touch sensing apparatus according to claim 1, wherein the plurality of light emitters is arranged above the touch surface.

9. The touch sensing apparatus according to claim 1, wherein the support structure is configured to be attached to a display.

10. The touch sensing apparatus according to claim 1, wherein the support structure further comprises a second portion extending from the first portion, wherein the second portion is configured to enable mounting of the plurality of light emitters and wherein the second portion is oriented substantially perpendicular to the first portion.

11. A method of manufacturing a touch sensing apparatus, the method comprising:
- providing a curved glass panel including a touch surface, the curved glass panel having a radius of curvature;
- mounting a plurality of light emitters on a support structure;
- positioning the support structure around a periphery of the curved glass panel, the support structure comprising a first portion extending over at least a portion of the periphery of the curved glass panel and separated by a space from the curved glass panel;
- positioning an optical element in the space between the glass panel and the first portion of the support structure, the optical element configured to at least partially seal the plurality of light emitters from contaminants; and
- adjusting the radius of curvature of the curved glass panel with the support structure along at least one side of the curved glass panel.

12. The method of claim 11, wherein the curved glass panel along at least one side of the glass panel is concave.

13. The method of claim 11, further comprising bending the curved glass panel with the support structure for said adjusting of the radius of curvature of the curved glass panel.

14. The method of claim 11, further comprising decreasing or increasing the radius of curvature of the curved glass panel with the support structure.

15. The method of claim 11, wherein positioning the optical element comprises sliding the optical element in the space in a direction parallel with a plane in which the curved glass panel extends.

* * * * *